US012136245B2

(12) United States Patent
Choi et al.

(10) Patent No.: US 12,136,245 B2
(45) Date of Patent: Nov. 5, 2024

(54) ELECTRONIC DEVICE FOR IDENTIFYING SUNSCREEN APPLIED TO A USER'S SKIN AND METHOD OF OPERATING THE SAME

(71) Applicant: SAMSUNG ELECTRONICS CO., LTD., Suwon-si (KR)

(72) Inventors: Hyoungseon Choi, Suwon-si (KR); Youngjae Oh, Suwon-si (KR); Jiwoon Jung, Suwon-si (KR); Joonho Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 227 days.

(21) Appl. No.: 17/736,369

(22) Filed: May 4, 2022

(65) Prior Publication Data

US 2022/0383605 A1 Dec. 1, 2022

Related U.S. Application Data

(63) Continuation of application No. PCT/KR2022/005050, filed on Apr. 7, 2022.

(30) Foreign Application Priority Data

May 28, 2021 (KR) .......................... 10-2021-0069094

(51) Int. Cl.
*H04N 7/18* (2006.01)
*G06V 10/141* (2022.01)
(Continued)

(52) U.S. Cl.
CPC .......... *G06V 10/141* (2022.01); *G06V 10/751* (2022.01); *G06V 10/761* (2022.01); *H04N 23/56* (2023.01)

(58) Field of Classification Search
CPC ........ H04N 23/56; H04N 7/18; G06V 10/141; G06V 10/761; G06V 10/751
(Continued)

(56) References Cited

U.S. PATENT DOCUMENTS 8,155,413 B2 * 4/2012 Chhibber ............. A61B 5/4875
382/128
9,816,857 B2 * 11/2017 Rastegar ............... G01J 1/0271
(Continued)

FOREIGN PATENT DOCUMENTS

JP 2005-321333 A 11/2005
JP 2011-80915 A 4/2011
(Continued)

OTHER PUBLICATIONS

Communication dated Jul. 18, 2022, issued by the International Searching Authority in counterpart International Application No. PCT/KR2022/005050 (PCT/ISA/210).
(Continued)

*Primary Examiner* — Trang U Tran
(74) *Attorney, Agent, or Firm* — Sughrue Mion, PLLC

(57) ABSTRACT

An electronic device includes a camera, a light source unit, a display, and a processor, wherein the processor is configured to obtain a first image of a skin of a user by the camera while a first light is output through the light source unit, obtain a second image of the skin of the user by the camera while the first light is not output through the light source unit, obtain a third image representing a difference between the first image and the second image by converting, into a first difference pixel value, a difference between first brightness values of the first image and second brightness values of the second image, and display, on the display, information on an ultraviolet (UV) protection ingredient applied to the skin of the user, based on the third image.

20 Claims, 19 Drawing Sheets

(51) Int. Cl.
  *G06V 10/74* (2022.01)
  *G06V 10/75* (2022.01)
  *H04N 23/56* (2023.01)
(58) Field of Classification Search
  USPC .......................................................... 348/77
  See application file for complete search history.

(56) References Cited

U.S. PATENT DOCUMENTS

| | | | |
|---|---|---|---|
| 9,851,298 | B1 | 12/2017 | Isikman et al. |
| 9,927,228 | B2 * | 3/2018 | Cho .................. G01J 1/429 |
| 10,324,032 | B2 | 6/2019 | Isikman et al. |
| 11,060,904 | B2 * | 7/2021 | Jeong .................. G02B 5/30 |
| 2013/0300850 | A1 | 11/2013 | Millikan |
| 2018/0220952 | A1 | 8/2018 | Lee et al. |
| 2019/0346306 | A1 | 11/2019 | Jeong et al. |
| 2020/0107772 | A1 | 4/2020 | Hu |
| 2020/0209056 | A1 | 7/2020 | Feldman |

FOREIGN PATENT DOCUMENTS

| | | |
|---|---|---|
| JP | 2014-81294 A | 5/2014 |
| KR | 10-2014-0042359 A | 4/2014 |
| KR | 10-2017-0037026 A | 4/2017 |
| KR | 10-2018-0088132 A | 8/2018 |
| KR | 10-2018-0107821 A | 10/2018 |
| KR | 10-2019-0023226 A | 3/2019 |
| WO | 2017/189923 A2 | 11/2017 |

OTHER PUBLICATIONS

Communication dated Jul. 18, 2022, issued by the International Searching Authority in counterpart International Application No. PCT/KR2022/005050 (PCT/ISA/237).

Communication issued on Jun. 10, 2024 by the European Patent Office for European Patent Application No. 22811477.3.

* cited by examiner (a)

(b)

ELECTRONIC DEVICE FOR IDENTIFYING SUNSCREEN APPLIED TO A USER'S SKIN AND METHOD OF OPERATING THE SAME

CROSS-REFERENCE TO RELATED APPLICATION(S)

This application is a Bypass Continuation Application of PCT International Application No. PCT/KR2022/005050, filed on Apr. 7, 2022, in the Korean Intellectual Property Office, which is based on and claims priority to Korean Patent Application No. 10-2021-0069094, filed on May 28, 2021, in the Korean Intellectual Property Office, the contents of which are incorporated herein by reference in their entireties.

BACKGROUND

1. Field

The disclosure relates to an electronic device configured to identify an ultraviolet (UV) protection ingredient applied to a user's skin, and a method for operating the same.

2. Description of Related Art

There has recently been widespread use of various electronic devices such as a smartphone, a tablet PC, a portable multimedia player (PMP), a personal digital assistant (PDA), a laptop personal computer, and a wearable device. In addition, various types of smart devices have been widely used.

There have been increasing services and additional functions provided through electronic devices, for example, portable electronic devices such as smartphones. In order to improve the utility value of such electronic devices and to satisfy various user demands, electronic device manufacturers provide various functions interlinked with other home appliances. Therefore, various functions provided through electronic devices are becoming highly sophisticated.

SUMMARY

In line with increasing attention to skin health, cosmetic products including ultraviolet (UV) protection agents are widely used. A professional imaging device is necessary to check the status of application of a cosmetic product including a UV protection agent, which has been applied to a user's skin. For example, a UV camera capable of recognizing UV reflected light may be used. However, UV cameras are bulky and expensive, and are not easily available to general users. That is, it is not easy for general users to check the status of application of cosmetic products including UV protection agents.

Provided is a method for identifying the status of application of a UV protection ingredient, which has been applied to a user's skin, by using a camera included in an electronic device.

Additional aspects will be set forth in part in the description which follows and, in part, will be apparent from the description, or may be learned by practice of the presented embodiments.

An electronic device according to various embodiments, an electronic device may include a camera, a light source unit, a display, and a processor, wherein the processor is configured to obtain a first image of a skin of a user by the camera while a first light is output through the light source unit, obtain a second image of the skin of the user by the camera while the first light is not output through the light source unit, obtain a third image representing a difference between the first image and the second image by converting, into a first difference pixel value, a difference between first brightness values of the first image and second brightness values of the second image, and display, on the display, information on an ultraviolet (UV) protection ingredient applied to the skin of the user, based on the third image.

An operation method of an electronic device according to various embodiments, may include obtaining a first image of a skin of a user through a camera included in the electronic device while a first light is output through a light source unit included in the electronic device, obtaining a second image of the skin of the user through the camera while the first light is not output through the light source unit, obtaining a third image representing a difference between the first image and the second image by converting, into a first pixel value, a difference between first brightness values of the first image and second brightness values of the second image, and displaying, on a display included in the electronic device, information on a UV protection ingredient applied to the skin of the user, based on the third image.

An electronic device according to various embodiments may include a camera, a display, and a processor, wherein the processor is configured to transmit a first control command to an external electronic device including at least one light source element so as to enable the external electronic device to output first light, obtain a first image a skin of user by the camera while the first light is output, transmit a second control command to the external electronic device so as to enable the at least one light source element not to output the first light, obtain a second image of the skin of the user by the camera while the first light is not output, obtain a third image representing a difference between the first image and the second image by converting, into a first difference pixel value, a difference between brightness first brightness values of the first image and second brightness values of the second image, and provide information on an ultraviolet (UV) protection ingredient applied to the skin of the user, based on the third image.

An electronic device according to various embodiments may effectively provide information regarding the status of application of an ultraviolet (UV) protection ingredient, which has been applied to a user's skin, by using a camera included in the electronic device.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
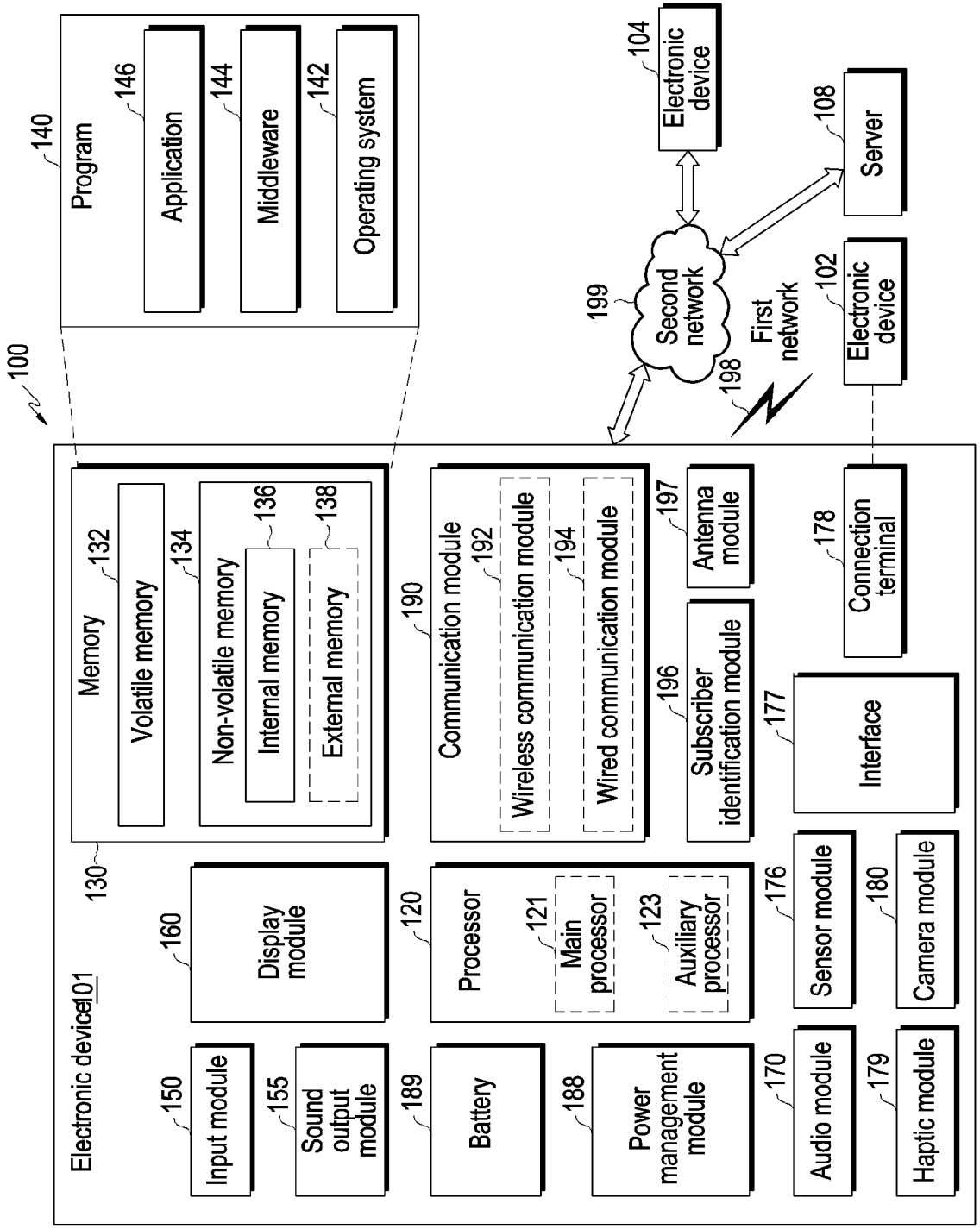
FIG. 1 is a block diagram of an electronic device in a network environment according to various embodiments.

FIG. 1 is a block diagram of an electronic device 101 in a network environment 100 according to various embodiments. Referring to FIG. 1, in the network environment 100, the electronic device 101 may communicate with an electronic device 102 through a first network 198 (e.g., a short-range wireless communication network), or may communicate with at least one of an electronic device 104 or a server 108 through a second network 199 (e.g., a long-range wireless communication network). According to an embodiment, the electronic device 101 may communicate with the electronic device 104 through the server 108. According to an embodiment, the electronic device 101 may include a processor 120, a memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module 196, or an antenna module 197. In an embodiment, at least one (e.g., the connection terminal 178) of the above elements may be omitted from the electronic device 101, or one or more other elements may be added thereto. In an embodiment, a part (e.g., the sensor module 176, the camera module 180, or the antenna module 197) of the elements may be integrated into a single element (e.g., the display module 160).

The processor 120 according to an embodiment disclosed herein may, for example, execute software (e.g., a program 140) to control at least another element (e.g., a hardware or software element) of the electronic device 101 connected to the processor 120, and perform various data-processing operations or calculations. According to an embodiment, as at least a part of the data-processing operations or calculations, the processor 120 may store, in a volatile memory 132, a command or data received from another element (e.g., the sensor module 176 or the communication module 190), process the command or data stored in the volatile memory 132, and store the resultant data in a nonvolatile memory 134. According to an embodiment, the processor 120 may include a main processor 121 (e.g., a central processing device, or an application processor), or an auxiliary processor 123 (e.g., a graphics processing device, a neural processing unit (NPU), an image signal processor, a sensor hub processor, or a communication processor) which can be operated independently from or together with the main processor. For example, if the electronic device 101 includes the main processor 121 and the auxiliary processor 123, the auxiliary processor 123 may be configured to use less power than that used by the main processor 121, or to be specialized for a designated function. The auxiliary processor 123 may be implemented as a part of the main processor 121, or separately therefrom.

The auxiliary processor 123 may, for example, control at least a part of functions or states related to at least one element (e.g., the display module 160, the sensor module 176, or the communication module 190) among the elements of the electronic device 101 on behalf of the main processor 121 while the main processor 121 is in an inactive (e.g., sleep) state, or together with the main processor 121 while the main processor 121 is in an active (e.g., application execution) state. According to an embodiment, the auxiliary processor 123 (e.g., an image signal processor or a communication processor) may be implemented as a part of another element (e.g., the camera module 180 or the communication module 190) that is functionally related to the auxiliary processor. According to an embodiment, the auxiliary processor 123 (e.g., a neural processing unit) may include a hardware structure specialized in processing an artificial-intelligence model. The artificial-intelligence model may be generated through machine learning. For example, such learning may be autonomously performed in the electronic device 101 in which an artificial intelligence model is operated, or may be performed through a separate server (e.g., the server 108). A learning algorithm may include, for example, supervised learning, unsupervised learning, semi-supervised learning, or reinforcement learning. However, the learning algorithm is not limited to the above example. The artificial-intelligence model may include a plurality of artificial-neural-network layers. An artificial neural network may be one of a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more of the above networks. However, the artificial neural network is not limited thereto. The artificial-intelligence model may include a software structure in addition to a hardware structure or as an alternative thereto.

The memory 130 may store various data used by at least one element (e.g., the processor 120 or the sensor module 176) of the electronic device 101. The data may include, for example, software (e.g., the program 140), and input data or output data related to a command related thereto. The memory 130 may include the volatile memory 132 or the nonvolatile memory 134.

The program 140 may be stored in the memory 130 as software and, for example, may include an operating system 142, middleware 144, or an application 146.

The input module 150 may receive a command or data to be used for an element (e.g., the processor 120) of the electronic device 101 from the outside (e.g., from a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes such as playback of multimedia or recording. The receiver may be used to receive an incoming call. According to an embodiment, the receiver may be implemented separately from the speaker, or as a part thereof.

The display module 160 may visually provide information to the outside (e.g., a user) of the electronic device 101. The display module 160 may include, for example, a display, a hologram device, or a projector, as well as a control circuit for controlling a corresponding device. According to an embodiment, the display module 160 may include a touch sensor configured to sense a touch, or a pressure sensor configured to measure the level of force generated by the touch.

The audio module 170 may convert sound into an electrical signal, or conversely may convert an electrical signal into sound. According to an embodiment, the audio module 170 may obtain sound through the input module 150, or may output sound through the sound output module 155, or an external electronic device (e.g., the electronic device 102) (e.g., a speaker or a headphone) that is directly or wirelessly connected to the electronic device 101.

The sensor module 176 may sense an operation state (e.g., power or temperature) of the electronic device 101 or an external environment state (e.g., a user's state), and generate an electrical signal or a data value corresponding to the sensed state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more designated protocols which are usable for the electronic device 101 to be directly or wirelessly connected to an external electronic device (e.g., the electronic device 102). According to an embodiment, the interface 177 may include, for example, a high-definition multimedia interface (HDMI), a universal serial bus (USB) interface, a secure digital (SD) card interface, or an audio interface.

A connection terminal 178 may include a connector through which the electronic device 101 can be physically connected to an external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert an electrical signal into an electrical stimulus, or a mechanical stimulus (e.g., vibration or movement) which a user can recognize through his/her tactile or kinesthetic sense. According to an embodiment, the haptic module 179 may include, for example, a motor, a piezoelectric element, or an electrostimulator.

The camera module 180 may capture a still image or a moving image. According to an embodiment, the camera module 180 may include one or more lenses, image sensors, image signal processors, or flashes.

The power management module 188 may manage the power supplied to the electronic device 101. According to an embodiment, the power management module 188 may be implemented, for example, as at least a part of a power management integrated circuit (PMIC).

The battery 189 may supply power to at least one element of the electronic device 101. According to an embodiment, the battery 189 may include, for example, a non-rechargeable primary battery, a rechargeable secondary battery, or a fuel battery.

The communication module 190 may support establishment of a direct (e.g., wired) communication channel or a wireless communication channel between the electronic device 101 and an external electronic device (e.g., the electronic device 102, the electronic device 104, or the server 108), and execution of communication through an established communication channel. The communication module 190 may be operated independently from the processor 120 (e.g., an application processor), and may include one or more communication processors supporting direct (e.g., wired) communication or wireless communication. According to an embodiment, the communication module 190 may include a wireless communication module 192 (e.g., a cellular communication module, a short-range wireless communication module, or a global navigation satellite system (GNSS) communication module), or a wired communication module 194 (e.g., a local area network (LAN) communication module or a power-line communication module). A corresponding communication module among the communication modules described above may communicate with the external electronic device 104 through the first network 198 (e.g., a short-range communication network such as Bluetooth, wireless fidelity (Wi-Fi) direct, or infrared data association (IrDA)), or the second network 199 (e.g., a long-range communication network such as a legacy cellular network, a 5G network, a next-generation communication network, the Internet, or a computer network (e.g., a LAN or wide area network (WAN))). Various types of communication modules as described above may be integrated into one element (e.g., a single chip), or may be implemented as multiple separate elements (e.g., multiple chips). The wireless communication module 192 may identify or authenticate the electronic device 101 in a communication network, such as the first network 198 or the second network 199, by using subscriber information (e.g., an international mobile subscriber identifier (IMSI)) stored in the subscriber identification module 196.

The wireless communication module 192 may support a 5G network and next-generation communication technology beyond 4G networks, for example, a new radio (NR) access technology. The NR access technology may support high-speed transfer of a large amount of data (enhanced mobile broadband (eMBB)), terminal power minimization and access by multiple terminals (massive machine type communications (mMTC)), or high reliability and low latency (ultra-reliable and low-latency communications (URLLC)). The wireless communication module 192 may support, for example, a high frequency band (e.g., mmWave band) in order to accomplish a high data transfer rate. The wireless communication module 192 may support various technologies for ensuring performance in high frequency bands, for example, beamforming, massive multiple-input and multiple-output (massive MIMO), full-dimensional MIMO (FD-MIMO), an array antenna, analog beamforming, or a large-scale antenna.

The wireless communication module 192 may support various requirements regulated for the electronic device 101, an external electronic device (e.g., the electronic device 104), or a network system (e.g., the second network 199). According to an embodiment, the wireless communication module 192 may support a peak data rate (e.g., 20 Gbps or higher) for implementation of eMBB, a loss coverage (e.g., 164 dB or lower) for implementation of mMTC, or a U-plane latency (e.g., 0.5 ms or lower for each of downlink (DL) and uplink (UL), or 1 ms or lower for round trip) for implementation of URLLC.

The antenna module 197 may transmit a signal or power to the outside (e.g., an external electronic device) or may receive same from the outside. According to an embodiment, the antenna module 197 may include an antenna including a radiator including a conductive pattern or a conductor disposed on a substrate (e.g., a PCB). According to an embodiment, the antenna module 197 may include multiple antennas (e.g., an array antenna). At least one antenna suitable for a communication scheme used in a communication network, such as the first network 198 or the second network 199, may be selected, for example, from among the multiple antennas by the communication module 190. A signal or power may be transmitted or received between the communication module 190 and an external electronic device through the selected at least one antenna. According to an embodiment, another component (e.g., a radio-frequency integrated circuit (RFIC)) other than the radiator may be additionally provided as a part of the antenna module 197.

According to various embodiments, the antenna module 197 may configure an mmWave antenna module. According to an embodiment, the mmWave antenna module may include a printed circuit board, an RFIC disposed on a first surface (e.g., the under surface) of the printed circuit board or disposed adjacent thereto, so as to support a designated high frequency band (e.g., an mmWave band), and a plurality of antennas (e.g., an array antenna) disposed on a second surface (e.g., the top surface or side surface) of the printed circuit board or disposed adjacent thereto, so as to transmit or receive a signal in the designated high frequency band.

At least a part of the elements described above may be connected to each other through a communication scheme between surrounding devices (e.g., a bus, a general-purpose input/output (GPIO), a serial peripheral interface (SPI), or a mobile industry processor interface (MIPI)), and may exchange a signal (e.g., a command or data) with each other.

According to an embodiment, a command or data may be transmitted or received between an electronic device 101 and the external electronic device 104 through the server 108 connected to the second network 199. Each of the external electronic devices 102 or 104 may be a device that is of a type identical to or different from that of the electronic device 101. According to an embodiment, all or a part of operations executed in the electronic device 101 may be executed in one or more external electronic devices among the external electronic devices 102, 104, or 108. For example, in the case where the electronic device 101 is required to perform a function or service automatically or in response to a request from a user or another device, the electronic device 101 may request one or more external electronic devices to perform at least a part of the function or service, in addition to or instead of executing the function or service by itself. The one or more external electronic devices having received the request may execute at least a part of the requested function or service, or an additional function or service related to the request, and may transfer a result of the execution to the electronic device 101. The electronic device 101 may or may not additionally process the result, and may provide the processed result as at least a part of a response for the request. To this end, for example, cloud-computing, distributed-computing, mobile-edge-computing (MEC), or client-server-computing technologies may be used. The electronic device 101 may provide, for example, ultra-low-latency service by using distributed computing or mobile edge computing. In another embodiment, the external electronic device 104 may include an Internet of things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart homes, smart cities, smart cars, or health care), based on 5G communication technology and IoT-related technology.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, and/or alternatives for a corresponding embodiment. With regard to the description of the drawings, similar reference numerals may be used to designate similar or relevant elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

According to various embodiments, in the specification, a sunscreen may means including a cosmetic product having an ultraviolet (UV) protection function as well as a sunscreen.

FIGS. 2A, 2B, 2C and 2D are diagrams illustrating a brief configuration of an electronic device according to various embodiments.

Referring to FIG. 2A to FIG. 2D, according to various embodiments, electronic devices 201 and 202 may be implemented to be identical to the electronic device 101 illustrated in FIG. 1. External electronic devices 204 and 205 may be implemented to be identical to the electronic device 102 or 104 illustrated in FIG. 1.

Figure 2A:
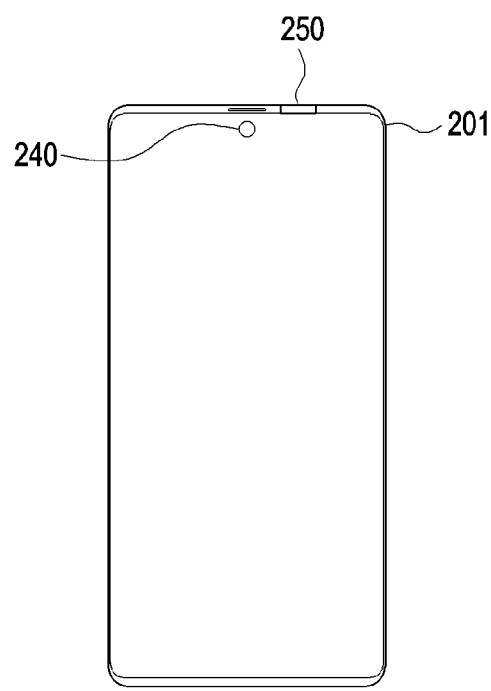
FIGS. 2A, 2B, 2C and 2D are diagrams illustrating a configuration of an electronic device according to various embodiments.
Figure 2B:
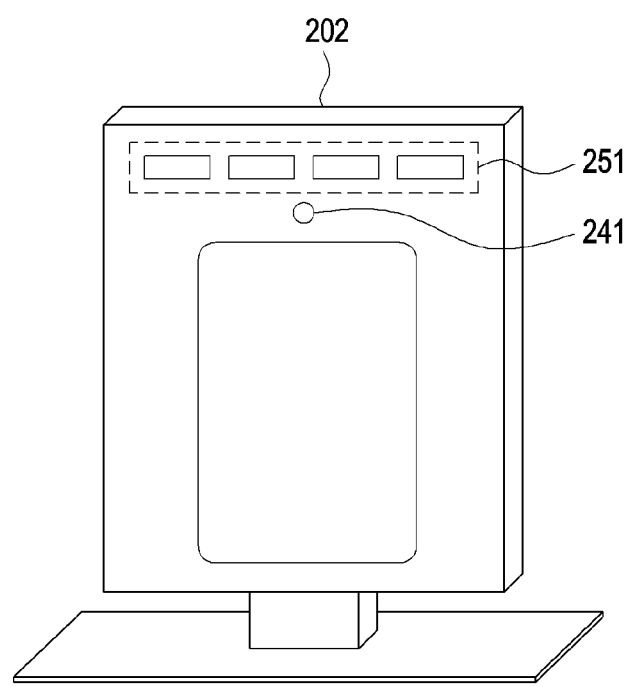

Referring to FIG. 2A and FIG. 2B, according to various embodiments, the electronic device 201 or 202 may capture an image of a user's skin (e.g., a user's face) by using a camera 240 or 241. The electronic device 201 or 202 may control the output of light (e.g., UV light or visible light) through a light source unit 250 or 251 capable of outputting UV light or visible light, so as to capture an image of a user's skin. For example, the electronic device 201 may obtain a first image through image capturing of a user's skin while UV light is output through the light source unit 250 or 251, and obtain a second image through image capturing of the user's skin while UV light is not output (e.g., no light has been output through the light source unit 250 or 251). For example, the first image may be an image of the user's skin captured through the camera 250 while first light is output. For example, the second image may be an image of the user's skin captured through the camera 250 while first light is not output. The electronic device 201 or 202 may obtain a third image representing the user's skin covered with a cosmetic product, a sunscreen, or a UV protection ingredient, based on a difference between the first image and the second image. The electronic device 201 or 202 may provide information on the cosmetic product, the sunscreen, or the UV protection ingredient applied to the user's skin, based on the third image. For example, the electronic device 201 may be implemented as a smartphone similarly as illustrated in FIG. 2A. Alternatively, the electronic device 202 may be implemented as a smart mirror similarly as illustrated in FIG. 2B.

Figure 2C:
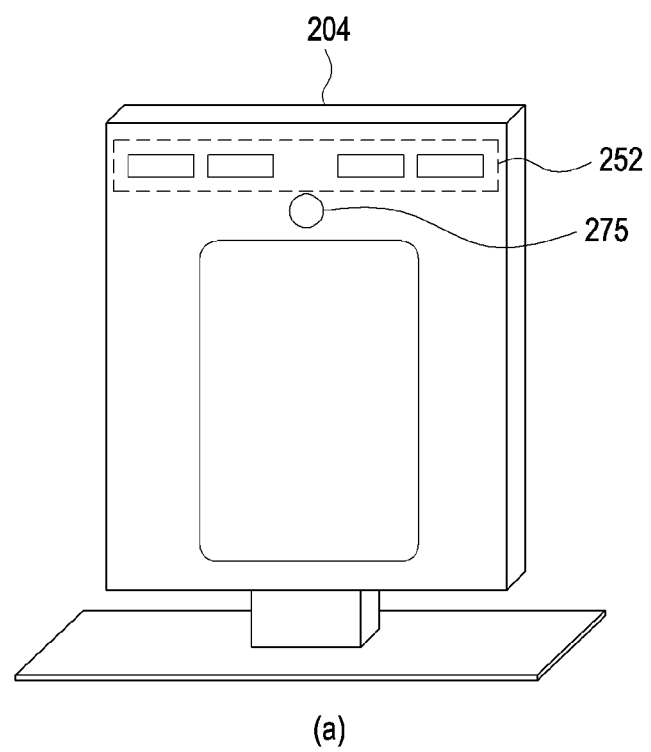
Figure 2C:
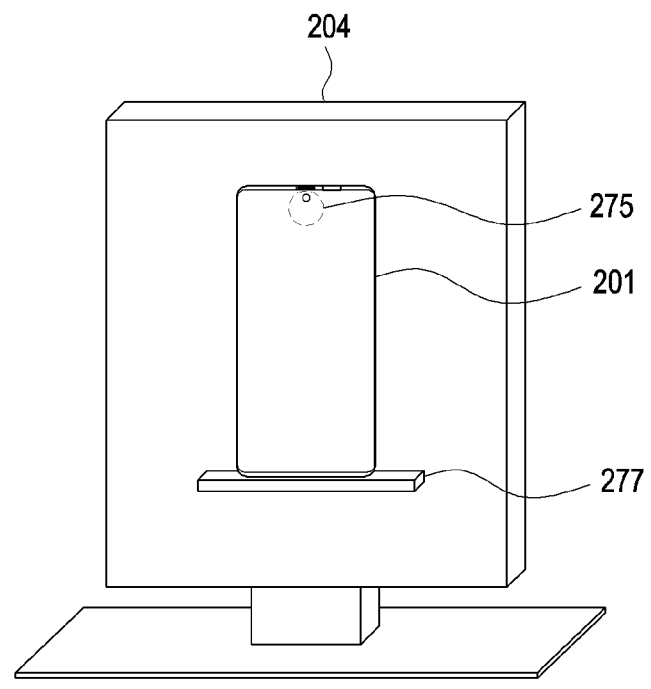
Figure 2D:
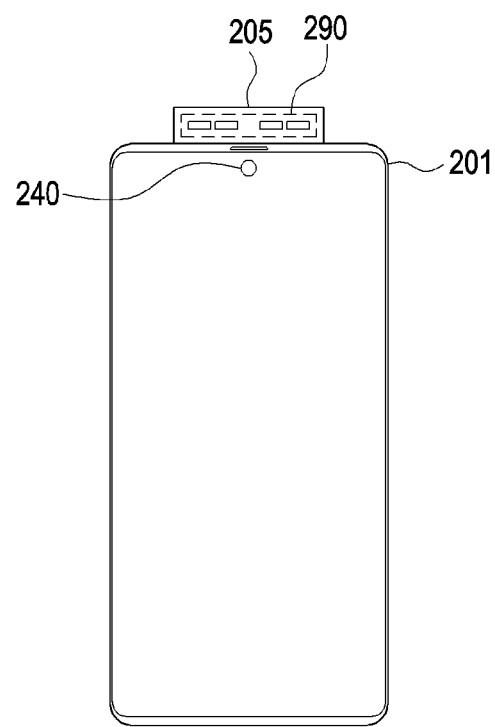

FIG. 2C (a) is a diagram illustrating a front surface of the external electronic device 204, and FIG. 2C (b) a diagram illustrating a rear surface of the external electronic device 204. Referring to FIG. 2C and FIG. 2D, according to various embodiments, the electronic device 201 may control the external electronic device 204 or 205 to enable light outputting of a light source unit 252 or 290 included in the external electronic device 204 or 205. For example, the electronic device 201 may be held on the external electronic device 204 similarly as illustrated in diagram (b) of FIG. 2C. For example, the external electronic device 204 may be implemented as a smart mirror including the light source unit 252 capable of outputting UV light and visible light. For example, the electronic device 201 may obtain an image by using light entering into a hole 275 in a state where the electronic device is held on the external electronic device 204, as illustrated in diagram (a) of FIG. 2C. For example, the electronic device 201 may be held on a support 277 positioned on a rear part of the external electronic device 204 as illustrated in diagram (b) of FIG. 2C. For example, the electronic device 201 may be connected to the external electronic device 205 similarly as illustrated in FIG. 2D. Alternatively, the external electronic device 205 may be attached to the electronic device 201 through an attachment/detachment means of the external electronic device 205. The external electronic device 205 may include the light source unit 290 including at least one light source element capable of outputting UV light and visible light. For example, the external electronic device 205 may be implemented as an accessory type device. The electronic device 201 may not include its own light source unit 250.

Referring to FIG. 2C and FIG. 2D, according to various embodiments, the electronic device 201 may capture an image of a user's skin by using the camera 240 in a state where the electronic device is held on the external electronic device 204, or the external electronic device 205 is attached to the electronic device. The electronic device 201 may control light (e.g., UV light or visible light) outputting of the light source unit 252 or 290 included in the external electronic device 204 or 205, so as to capture an image of a user's skin. For example, the electronic device 201 may obtain a first image through image capturing of a user's skin while UV light is output by the light source unit 252 or 290, and obtain a second image through image capturing of the user's skin while UV light is not output (e.g., the light source unit 252 or 290 outputs no light). The electronic device 201 may obtain a third image representing the user's skin covered with a cosmetic product, a sunscreen, or a UV protection ingredient, based on a difference between the first image and the second image. The electronic device 201 may provide information on the cosmetic product, the sunscreen, or the UV protection ingredient applied to the user's skin, based on the third image.

Figure 3:
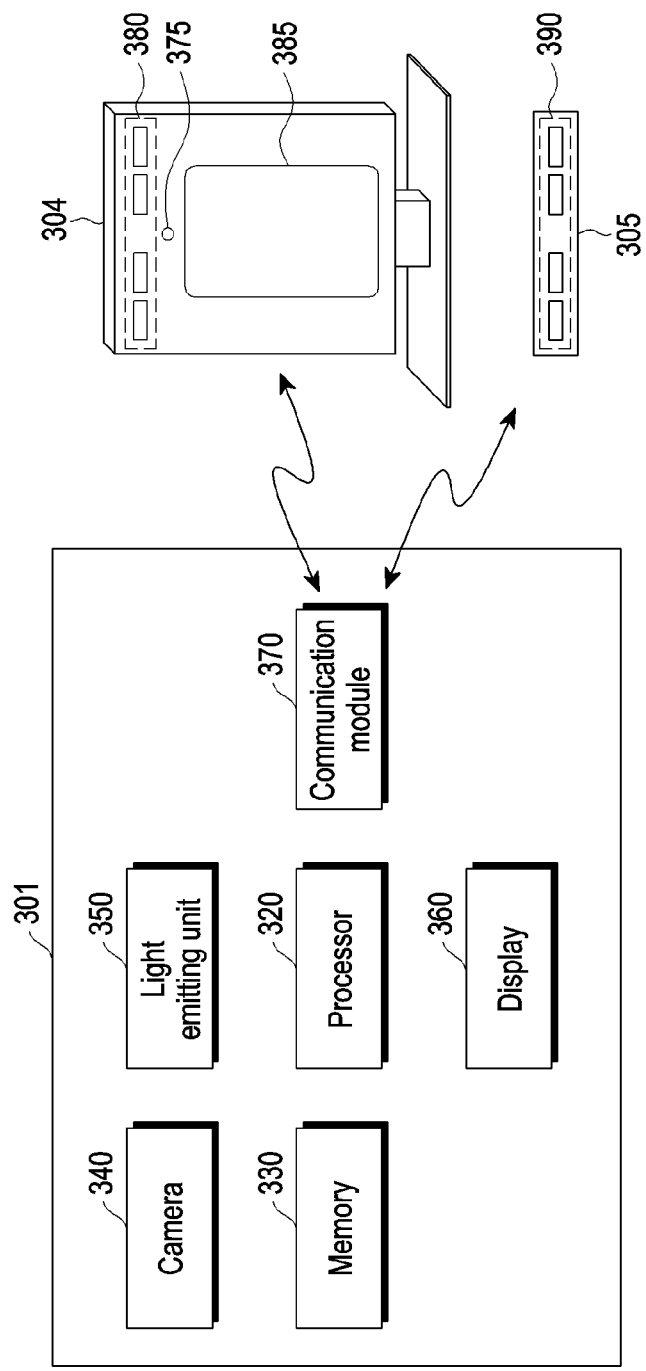
FIG. 3 is a block diagram illustrating a brief configuration of an electronic device according to various embodiments.

FIG. 3 is a block diagram illustrating a brief configuration of an electronic device according to various embodiments.

Referring to FIG. 3, an electronic device 301 may be implemented to be identical or similar to the electronic devices 201 or 202 illustrated in FIG. 2.

According to various embodiments, the electronic device 301 may include a processor 320, a memory 330, a camera 340 (e.g., the camera module 180 in FIG. 1 or the camera 240 in FIG. 2), a light source unit 350 (e.g., the light source unit 250 in FIG. 2), a display 360 (e.g., the display module 160 in FIG. 1), and a communication module 370 (e.g., the communication module 190 in FIG. 1).

According to various embodiments, the processor 320 may control overall operations of the electronic device 301. For example, the processor 320 may capture an image of a user's skin through the camera 340, and provide information on a cosmetic product or a sunscreen applied to the user's skin.

According to various embodiments, the processor 320 may control light output of the light source unit 350 when capturing a user's skin through the camera 340. For example, the light source unit 350 may include at least one light source element. The light source unit 350 may output light including UV light and/or visible light.

According to various embodiments, the processor 320 may capture a first image including a user's skin through the camera 340 while first light is output through the light source unit 350. The processor 320 may, after capturing the first image, capture a second image including the user's skin through the camera 340 while first light is not output through the light source unit 350. The processor 320 may convert, into a pixel value, the difference between brightness values of the first image and the second image. The processor 320 may obtain a third image representing a difference between the first image and the second image by using the converted pixel value. For example, the processor 320 may obtain a third image representing a degree of a UV protection ingredient applied, in a case where the UV protection ingredient is included in a cosmetic product applied to a user's skin. The processor 320 may display, on the display 360, information on the UV protection ingredient applied to the user's skin, based on the third image. For example, the first light may include UV light. For example, the information on the UV protection ingredient may include a visualized image so as to enable recognition of information of the UV protection ingredient (e.g., a sunscreen) applied to the user's skin. For example, the visualized image may indicate a degree of the UV protection ingredient (e.g., a sunscreen) applied to the user's skin through a contrast ratio. In addition, the information on the UV protection ingredient may include a message indicating information on the application of, to the user's skin, the UV protection ingredient.

According to various embodiments, the processor 320 may transmit a control command to an external electronic device 304 and/or 305 through the communication module 370. For example, the processor 320 may control light outputting of a light source unit 380 or 390 included in the external electronic device 304 or 305 by transmitting a control command when an image of a user's skin is captured through the camera 340. For example, the light source unit 380 or 390 may include at least one light source element. The light source unit 380 or 390 may output light including UV light and/or visible light.

According to various embodiments, the processor 320 may transmit a first control command to the external electronic device 304 or 305 so as to enable the external electronic device 304 or 305 to output the first light. The processor 320 may capture a first image including a user's skin through the camera 340 while the first light is output by the external electronic device 304 or 305. The processor 320 may, after capturing the first image, transmit a second control command to the external electronic device 304 or 305 so as to enable the external electronic device 304 or 305 not to output the first light. The processor 320 may capture a second image including the user's skin through the camera 340 while the first light is not output. The processor 320 may convert, into a pixel value, the difference between brightness values of the first image and the second image. The processor 320 may obtain a third image representing a difference between the first image and the second image by using the converted pixel value. The processor 320 may display, on the display 360, information on the sunscreen applied to the user's skin, based on the third image. Alternatively, the processor 320 may transmit a third control command to the external electronic device 304 so as to enable the information on the sunscreen to be displayed on a display 385 included in the external electronic device 304. The processor 320 may also transmit the information on the sunscreen to the external electronic device 304.

According to various embodiments, the processor 320 may identify the ingredient or the type of a sunscreen included in a cosmetic product used for a user's skin. For example, the processor 320 may capture an image of a cosmetic product through the camera 340, and compare the captured image with data relating to cosmetic products stored in the memory 330 so as to identify the ingredient or the type of a sunscreen included in the corresponding cosmetic product. Alternatively, the processor 320 may receive information (e.g., a name, or ingredient information of a sunscreen) on a cosmetic product from a user, and identify the ingredient or the type of a sunscreen included in the corresponding cosmetic product, based on the received information. Alternatively, the processor 320 may capture an image of a user's skin before image capturing of a first image, and identify the ingredient or the type of a sunscreen included in a corresponding cosmetic product according to whether a white cast is found on the user's skin. The processor 320 may determine which light to output among first light (e.g., UV light) or second light (e.g., visible light) through the light source unit 350, according to a result of the identification. Alternatively, the processor 320 may also determine which light to output among the first light or the second light through the light source unit 350, according to a user's configuration.

According to various embodiments, the processor 320 may output second light different from the first light through the light source unit 350 in a case where a sunscreen included in a cosmetic product is a reflective sunscreen (e.g., a sunscreen containing a zinc oxide component). Alternatively, the processor 320 may transmit a fourth control command to the external electronic device 304 or 305 so as to enable the external electronic device 304 or 305 to output the second light. The processor 320 may capture a fourth image including the user's skin through the camera 340 while the second light is output. For example, the fourth image may be an image of the user's skin captured through the camera 340 while the second light is output. The processor 320 may display, on the display 360, information on the sunscreen applied to the user's skin, based on the fourth image. For example, the second light may include visible light.

According to various embodiments, the processor 320 may output the first light through the light source unit 350 even in a case where a sunscreen included in a cosmetic product is a reflective sunscreen (e.g., a sunscreen containing a zinc oxide component). That is, a method using the output of the first light may be used independent of the ingredient of a sunscreen included in a cosmetic product.

At least a part of operations performed by the electronic device 301 described below may be performed by the processor 320. However, a subject of operations will be assumed to be the electronic device 301 for convenience of explanation.

Figure 4:
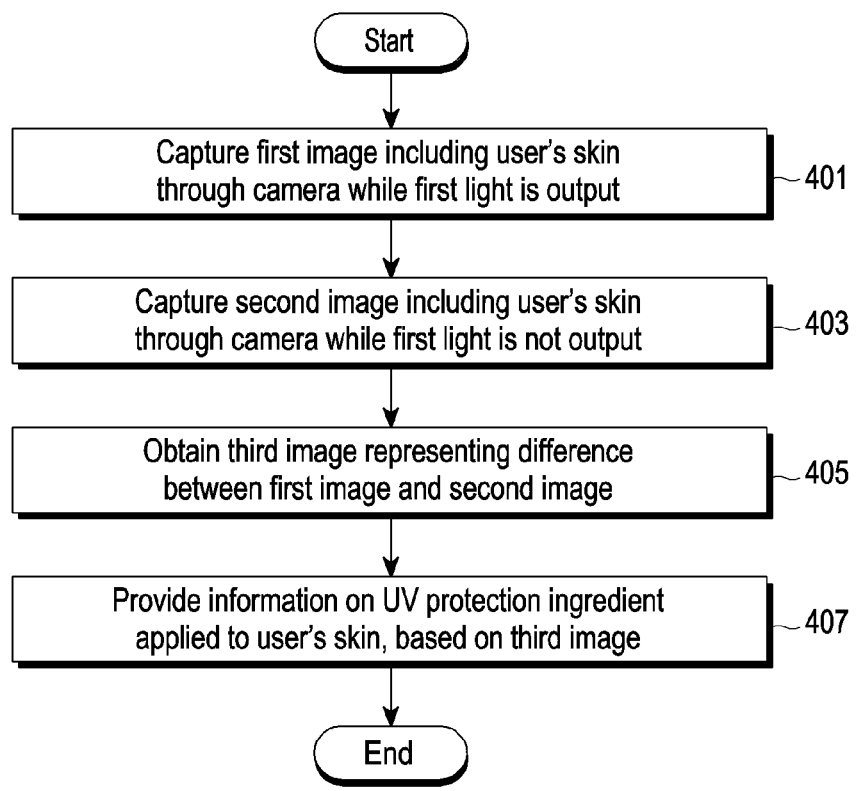
FIG. 4 is a flowchart of an operation in which an electronic device controls output of first light to obtain information on an ultraviolet (UV) protection ingredient applied to a user's skin according to various embodiments.

FIG. 4 is a flowchart of an operation in which an electronic device controls output of first light to obtain information on a UV protection ingredient applied to a user's skin according to various embodiments.

Referring to FIG. 4, according to various embodiments, in operation 401, the electronic device 301 may capture a first image including a user's skin through a camera while first light is output. The first light may be output from the light source unit 350 or the external electronic device 304 or 305. For example, the first light may include UV light.

According to various embodiments, in operation 403, the electronic device 301 may capture a second image including the user's skin through the camera while the first light is not output.

According to various embodiments, in operation 405, the electronic device 301 may obtain a third image representing a difference between the first image and the second image. For example, the electronic device 301 may convert, into a pixel value, the difference between brightness values of the first image and the second image, so as to obtain a third image. In the third image, an area to which a sunscreen is applied may be displayed to be dark (or displayed by using a black tone). On the contrary, in the third image, an area to which a sunscreen is not applied may be displayed to be bright (or displayed by using a white tone).

According to various embodiments, in operation 407, the electronic device 301 may provide information on a UV protection ingredient (e.g., a sunscreen) applied to the user's skin, based on the third image. For example, the electronic device 301 may display, on the display 360 or the display 385 of the external electronic device 304, the information on the UV protection ingredient (e.g., the sunscreen) applied to the user's skin. The electronic device 301 may display, as the information on the sunscreen, a fifth image visualized through a conversion of a color space of the third image (e.g., convert red, green and blue (RGB) into hue, saturation and value (HSV)). Alternatively, the electronic device 301 may display, as the information on the UV protection ingredient (e.g., the sunscreen), a sixth image visualized through application of a contrast characteristic of the third image to the second image which is a general photograph. For example, in the fifth image or the sixth image, an area to which the UV protection ingredient (e.g., the sunscreen) is applied may be displayed to be dark (or displayed by using a black tone), and an area to which a UV protection ingredient (e.g., a sunscreen) is not applied may be displayed to be bright (or displayed by using a white tone).

Figure 5:
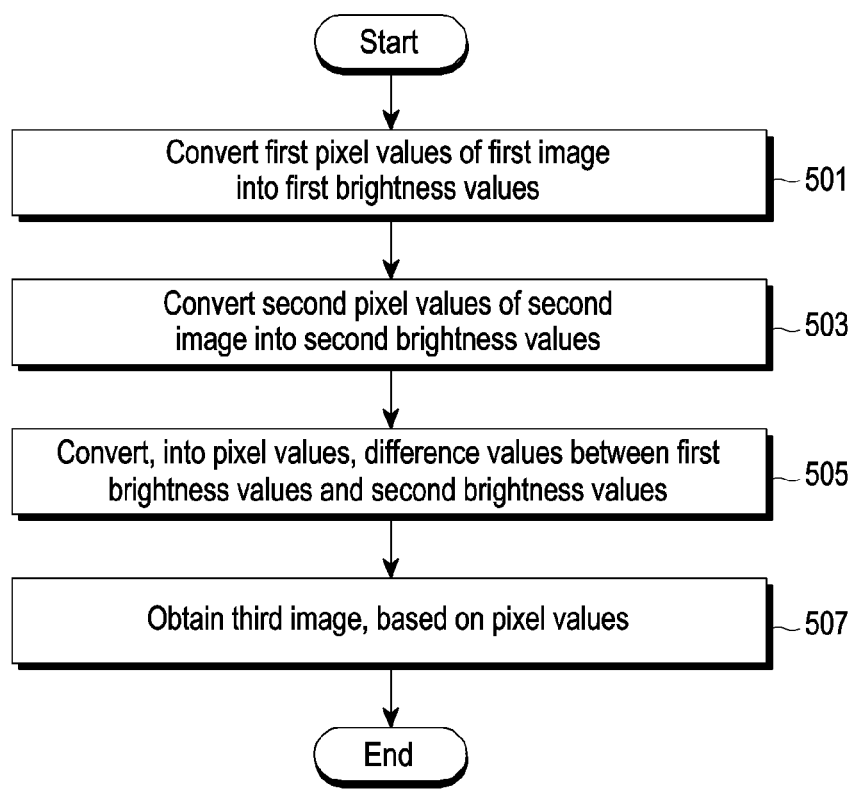
FIG. 5 is a flowchart of an operation in which an electronic device controls output of first light to obtain a third image according to various embodiments.

FIG. 5 is a flowchart of an operation in which an electronic device controls output of first light to obtain a third image according to various embodiments.

According to various embodiments, for example, the electronic device 301 may generate a first image and a second image by converting, into pixel values, a signal corresponding to the brightness of light, which is sensed by an image sensor included in the camera 340. That is, the first image and the second image may include multiple pixel values. For example, the electronic device 301 may convert, into pixel values, a signal corresponding to the brightness of sensed light, based on a relation formula between a brightness value and a pixel value stored in the memory 330.

Referring to FIG. 5, according to various embodiments, in operation 501, the electronic device 301 may convert first pixel values of a first image into first brightness values. For example, the electronic device 301 may convert the first pixel values into the first brightness values, based on a relation formula between a brightness value and a pixel value stored in the memory 330.

According to various embodiments, in operation 503, the electronic device 301 may convert second pixel values of a second image into second brightness values. For example, the electronic device 301 may convert the second pixel values into the second brightness values, based on the relation formula between a brightness value and a pixel value stored in the memory 330.

According to various embodiments, in operation 505, the electronic device 301 may convert, into pixel values, difference values between the first brightness values and the second brightness values. For example, the electronic device 301 may identify the difference values between the first brightness values and the second brightness values, respectively. The electronic device 301 may determine the identified difference values to be brightness values, and identify pixel values corresponding to the determined brightness values through the relation formula between a brightness value and a pixel value stored in the memory 330. That is, the electronic device 301 may determine the difference values between the first brightness values and the second brightness values to be brightness values through the relation formula between a brightness value and a pixel value, and convert the determined brightness values into pixel values again, based on the relation formula between a brightness value and a pixel value.

According to various embodiments, in operation 507, the electronic device 301 may obtain a third image, based on the converted pixel values. Accordingly, the electronic device 301 can obtain a visibility-reinforced image used in determining whether a sunscreen has been applied. Moreover, the electronic device 301 can also obtain an image enabling determination of whether a sunscreen has been applied, through the general camera 340 rather than a UV camera.

Figure 6:
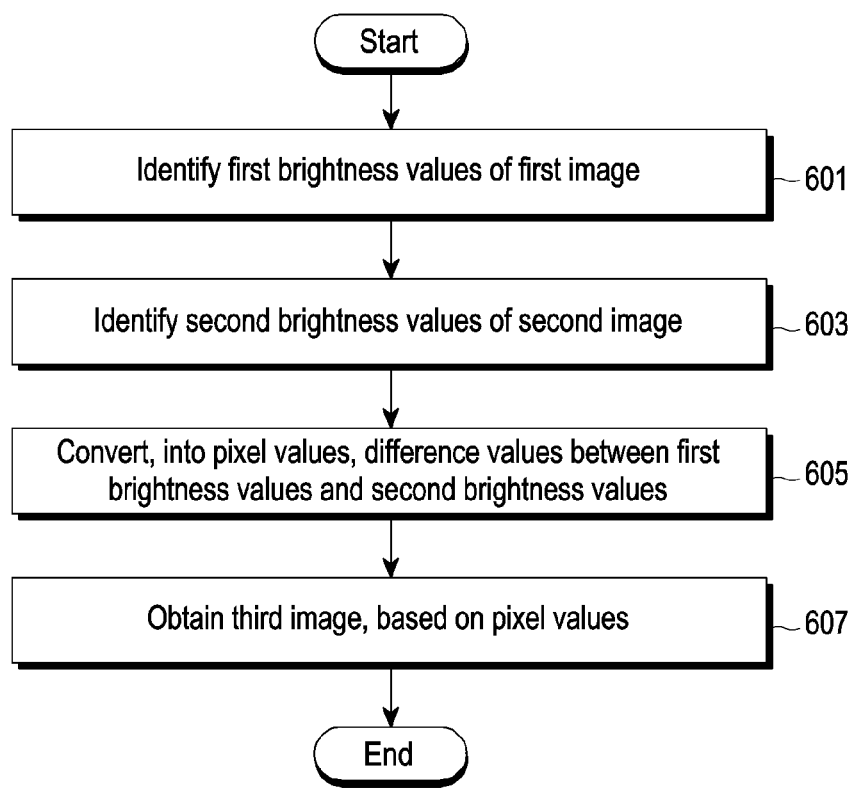
FIG. 6 is a flowchart of an operation in which an electronic device controls output of first light to obtain a third image according to various embodiments.

FIG. 6 is a flowchart of an operation in which an electronic device controls output of first light to obtain a third image according to various embodiments.

According to various embodiments, for example, the electronic device 301 may immediately identify a signal corresponding to the brightness of light sensed by an image sensor included in the camera 340, when a first image and a second image are captured.

Referring to FIG. 6, according to various embodiments, in operation 601, the electronic device 301 may identify first brightness values of a first image, based on a signal corresponding to the brightness of light sensed by an image sensor included in the camera 340.

According to various embodiments, in operation 603, the electronic device 301 may identify second brightness values of a second image, based on a signal corresponding to the brightness of light sensed by an image sensor included in the camera 340.

According to various embodiments, in operation 605, the electronic device 301 may convert, into pixel values, difference values between the first brightness values and the second brightness values. For example, the electronic device 301 may identify the difference values between the first brightness values and the second brightness values, respectively. The electronic device 301 may determine the identified difference values to be brightness values, and identify pixel values corresponding to the determined brightness values through the relation formula between a brightness value and a pixel value stored in the memory 330. That is, the electronic device 301 may determine the difference values between the first brightness values and the second brightness values to be brightness values through the relation formula between a brightness value and a pixel value, and convert the determined brightness values into pixel values again, based on the relation formula between a brightness value and a pixel value.

According to various embodiments, in operation 607, the electronic device 301 may obtain a third image, based on the converted pixel values.

Figure 7:
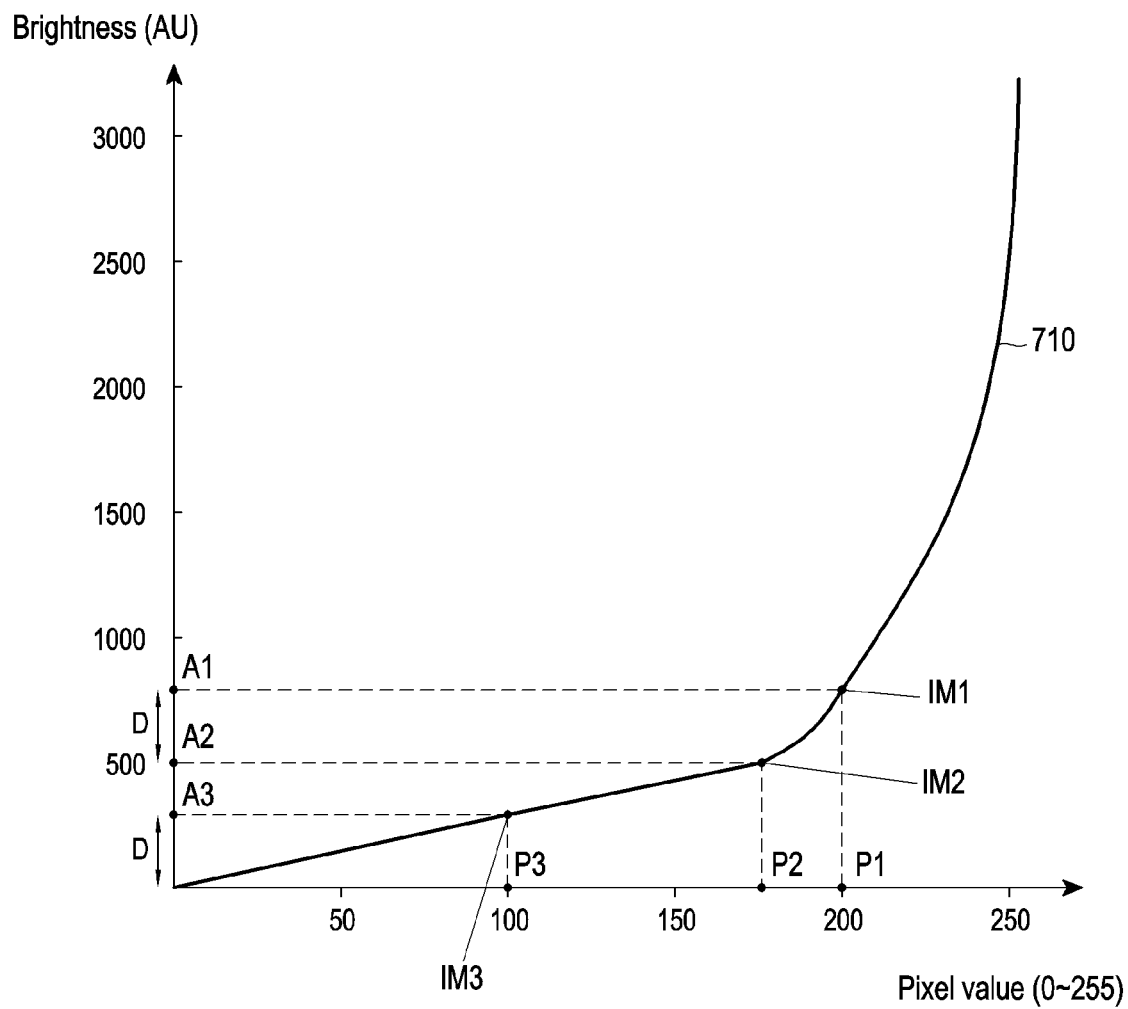
FIG. 7 is a diagram illustrating an operation in which an electronic device obtains a third image, based on the brightness difference between a first image and a second image according to various embodiments.

FIG. 7 is a diagram illustrating an operation in which an electronic device obtains a third image, based on the brightness difference between a first image and a second image according to various embodiments.

Referring to FIG. 7, according to various embodiments, the electronic device 301 may store a relation formula 710 between a brightness value and a pixel value in the memory 330. For example, a pixel value may be 0 to 255 according to brightness. The electronic device 301 may convert, into pixel values, a signal corresponding to the brightness of light sensed by an image sensor included in the camera 340, based on the relation formula 710, and may generate a first image IM1 and a second image IM2, based on the converted pixel values.

According to various embodiments, the electronic device 301 may convert a first pixel value P1 of the first image IM1 into a first brightness value A1, based on the relation formula 710. The electronic device 301 may convert a second pixel value P2 of the second image IM2 into a second brightness value A2, based on the relation formula 710. The electronic device 301 may identify a difference value D between the first brightness value A1 and the second brightness value A2. The electronic device 301 may determine the difference value D to be a third brightness value A3, and may identify a third pixel value P3 corresponding to the third brightness value A3, based on the relation formula 710.

According to various embodiments, the electronic device 301 may obtain a third image IM3, based on the third pixel value P3.

Figure 8:
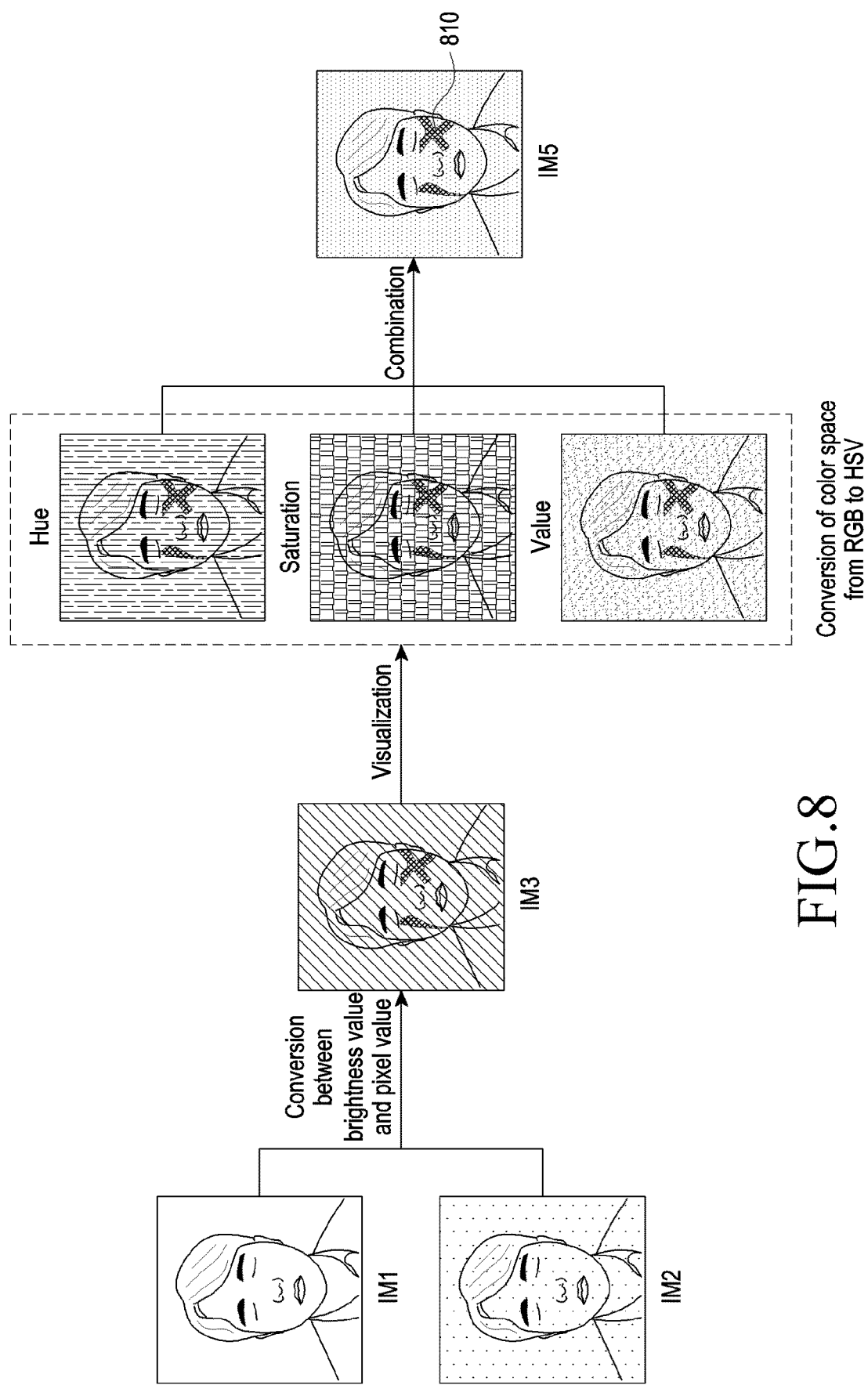
FIG. 8 is a diagram illustrating an operation in which an electronic device obtains a third image, based on a first image and a second image, and obtains an image through visualization of the third image according to various embodiments.

FIG. 8 is a diagram illustrating an operation in which an electronic device obtains a third image, based on a first image and a second image, and obtains an image through visualization of the third image according to various embodiments.

According to various embodiments, the electronic device 301 may capture (or obtain) a first image IM1 while first light (e.g., UV light) is output. Thereafter, the electronic device 301 may capture (or obtain) a second image IM2 while the first light is not output.

According to various embodiments, the electronic device 301 may convert, into a pixel value, a difference value between brightness values of the first image IM1 and the second image IM2, to obtain a third image IM3, as described with reference to FIG. 5 to FIG. 7. For example, the third image IM3 may be an image based on red, green, and blue (RGB).

According to various embodiments, the electronic device 301 may visualize the third image IM3 to reinforce visibility. For example, the electronic device 301 may convert a color space of the third image IM3, which is RGB, based on hue, saturation, and value (HSV). That is, the electronic device 301 may convert the third image IM3 into images based on hue, saturation, and value, and combine the converted images to generate a fifth image IM5. The electronic device 301 converting the color space of the third image IM3 from RGB to HSV merely corresponds to an example, and the technical concept of the disclosure may not be limited thereto. For example, the electronic device 301 may convert the color space of the third image IM3 into cyan, magenta, yellow, and key (CMYK), or CIE xyz other than HSV, or may perform a tuning visualization such as maintaining only one color (e.g., blue) among RGB.

According to various embodiments, the electronic device 301 may display the fifth image IM5 on the display 360. Alternatively, the electronic device 301 may transmit a control command to the external electronic device 304 so as to enable the fifth image IM5 to be displayed on the display 385 of the external electronic device 304. For example, the fifth image IM5 may be an image having reinforced visibility for a sunscreen 810 applied to a user's skin (e.g., face).

Figure 9:
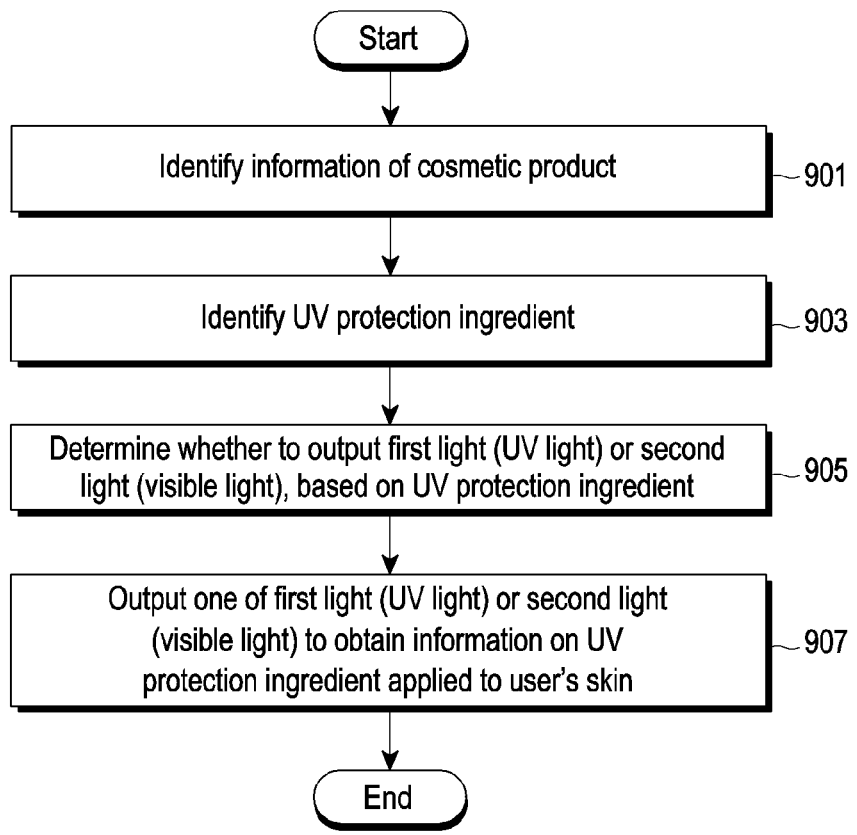
FIG. 9 is a flowchart of an operation in which an electronic device determines whether to output one of first light or second light, based on cosmetic product information according to various embodiments.

FIG. 9 is a flowchart of an operation in which an electronic device determines whether to output one of first light or second light, based on cosmetic product information according to various embodiments.

Referring to FIG. 9, according to various embodiments, in operation 901, the electronic device 301 may identify information of a cosmetic product used by a user, before an image of the user's skin is captured. For example, the electronic device 301 may capture an image of a cosmetic product through the camera 340, and identify information of the cosmetic product through comparison between the captured cosmetic product and data relating to a cosmetic products stored in the memory 330. Alternatively, the electronic device 301 may directly obtain the information (e.g., the name or the ingredient) of the cosmetic product from the user.

According to various embodiments, in operation 903, the electronic device 301 may identify a UV protection ingredient (and/or the type of the UV protection ingredient) included in the cosmetic product. For example, the electronic device 301 may identify whether the UV protection ingredient is a reflective UV protection ingredient (e.g., a sunscreen reflecting external UV light) or an absorption type UV protection ingredient (e.g., a sunscreen absorbing external UV light). For example, when a zinc oxide component is included in a sunscreen included in the cosmetic product, the electronic device 301 may determine that a reflective UV protection ingredient (or a reflective sunscreen) is included.

According to various embodiments, in operation 905, the electronic device 301 may determine whether to output first light (UV light) or second light (visible light), based on the UV protection ingredient (and/or the type of the UV protection ingredient). For example, the electronic device 301 may determine to output the first light when an image of the user's skin is captured, in a case where the cosmetic product includes an absorption type UV protection ingredient. The electronic device 301 may determine to output the second light when an image of the user's skin is captured, in a case where the cosmetic product includes a reflective sunscreen. In a case where the cosmetic product includes a reflective UV protection ingredient, the electronic device 301 may output the first light instead of the second light to capture an image of the user's skin.

According to various embodiments, in operation 907, the electronic device 301 may output one of the first light (UV light) or the second light (visible light) to obtain information on the UV protection ingredient applied to the user's skin. For example, in a case where a reflective UV protection ingredient is included in the cosmetic product, the electronic device 301 may output one of the first light or the second light to capture an image of the user's skin. For example, outputting one of the first light or the second light when an image of the user's skin is captured may be determined by a selection of the user or automatically determined by the processor 320. In a case where an absorption type UV protection ingredient is included in the cosmetic product, the electronic device 301 may output the first light to capture an image of the user's skin.

Figure 10:
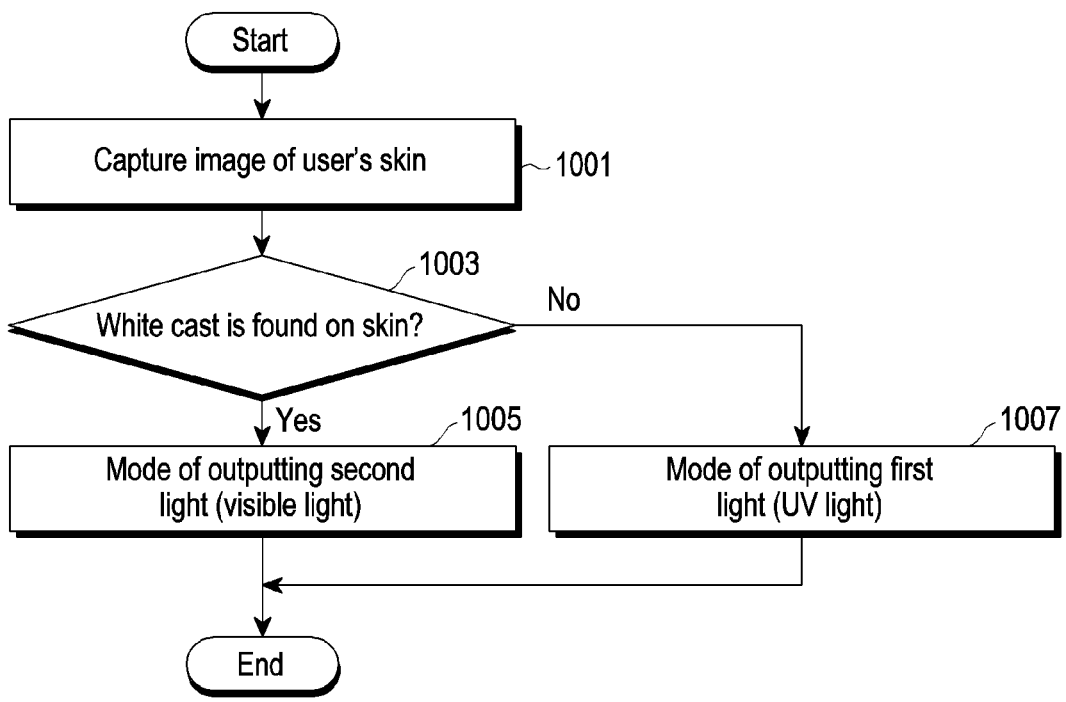
FIG. 10 is a flowchart of an operation in which an electronic device determines whether to output one of first light or second light, based on a UV protection ingredient according to various embodiments.

FIG. 10 is a flowchart of an operation in which an electronic device determines whether to output one of first light or second light, based on a UV protection ingredient according to various embodiments.

Referring to FIG. 10, according to various embodiments, in operation 1001, the electronic device 301 may capture an image of a user's skin to identify information of a cosmetic product used by the user. For example, the electronic device 301 may obtain a captured image of the user's skin.

According to various embodiments, in operation 1003, the electronic device 301 may determine whether a white cast is found on the user's skin, the image of which is captured. For example, the electronic device 301 may determine whether a white cast is found, through the captured image of the user's skin.

According to various embodiments, when a white cast is found on the user's skin, the image of which is captured (Yes in operation 1003), in operation 1005, the electronic device 301 may capture an image of the user's skin in a mode of outputting second light (e.g., visible light). According to another embodiment, the electronic device 301 may not output the second light according to the user's selection or configuration, and may capture an image of the user's skin in a mode of outputting first light (e.g., UV light). Accordingly, a method of obtaining, by the electronic device 301, information on a sunscreen applied to the user's skin will be described with reference to FIG. 11 and FIG. 12.

According to various embodiments, when a white cast is not found on the user's skin, the image of which is captured (No in operation 1003), in operation 1007, the electronic device 301 may capture an image of the user's skin in a mode of outputting the first light (e.g., UV light). For example, the electronic device 301 may obtain and provide information on the sunscreen applied to the user's skin according to the method described with reference to FIG. 8.

Figure 11:
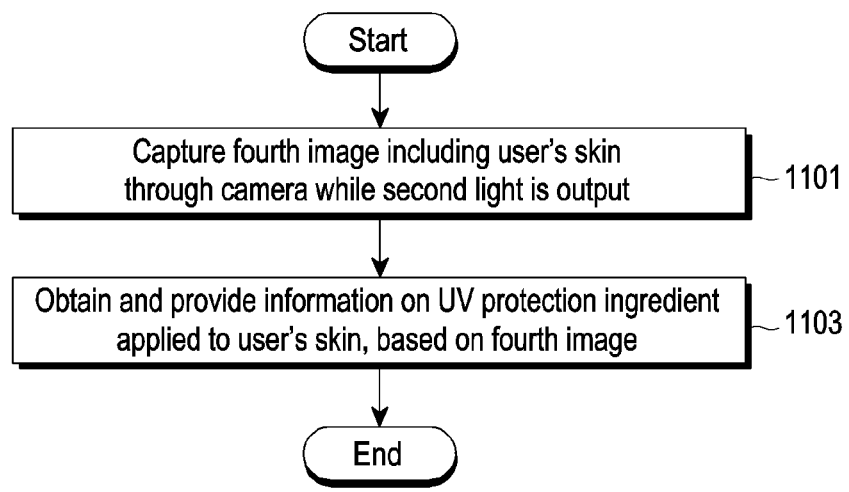
FIG. 11 is a flowchart of an operation in which an electronic device controls output of second light to obtain information on a UV protection ingredient applied to a user's skin according to various embodiments.

FIG. 11 is a flowchart of an operation in which an electronic device controls output of second light to obtain information on a UV protection ingredient applied to a user's skin according to various embodiments.

Referring to FIG. 11, according to various embodiments, in operation 1101, in a case where a user has used a cosmetic product (or a reflective sunscreen) including a reflective UV protection ingredient, the electronic device 301 may capture a fourth image including a user's skin through the camera 340 while second light (e.g., visible light (white light)) is output.

According to various embodiments, in operation 1103, the electronic device 301 may obtain and provide information on the UV protection ingredient applied to the user's skin, based on the fourth image. For example, the electronic device 301 may visualize the fourth image to reinforce the visibility of an area to which the UV protection ingredient is applied (e.g., an area in which a white cast is left). Accordingly, the electronic device 301 can obtain a visibility-reinforced image used in determining whether a reflective UV protection ingredient has been applied.

Figure 12:
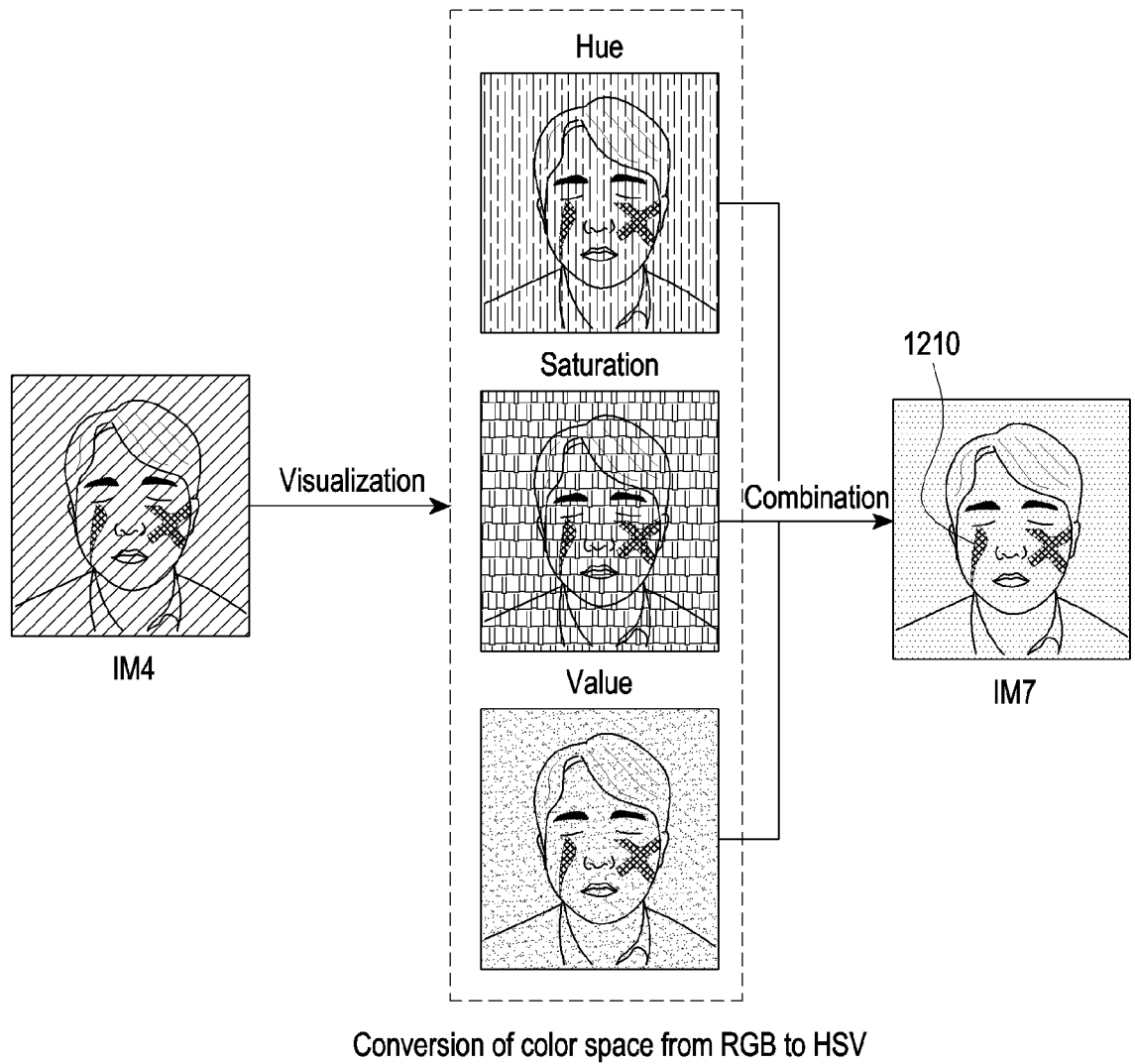
FIG. 12 is a diagram illustrating an operation in which an electronic device outputs second light to obtains a fourth image, and obtains an image through visualization of the fourth image according to various embodiments.

FIG. 12 is a diagram illustrating an operation in which an electronic device outputs second light to obtains a fourth image, and obtains an image through visualization of the fourth image according to various embodiments.

According to various embodiments, the electronic device 301 may capture (or obtain) a fourth image IM4 while second light (e.g., visible light (white light)) is output. For example, the fourth image IM4 may be an image based on red, green, and blue (RGB)

According to various embodiments, the electronic device 301 may visualize the fourth image IM4 to reinforce visibility. For example, the electronic device 301 may convert a color space of the fourth image IM4, which is RGB, based on hue, saturation, and value (HSV). That is, the electronic device 301 may convert the fourth image IM4 into images based on hue, saturation, and value, and combine the converted images to generate a seventh image IM7. The electronic device 301 converting the color space of the fourth image IM4 from RGB to HSV merely corresponds to an example, and the technical concept of the disclosure may not be limited thereto. For example, the electronic device 301 may convert the color space of the fourth image IM4 into cyan, magenta, yellow, and key (CMYK), or CIE xyz other than HSV, or may perform a tuning visualization such as maintaining only one color (e.g., blue) among RGB.

According to various embodiments, the electronic device 301 may display the seventh image IM7 on the display 360. Alternatively, the electronic device 301 may transmit a control command to the external electronic device 304 so as to enable the seventh image IM7 to be displayed on the display 385 of the external electronic device 304. For example, the seventh image IM7 may be an image having reinforced visibility for a sunscreen 1210 applied to a user's skin (e.g., face).

Figure 13:
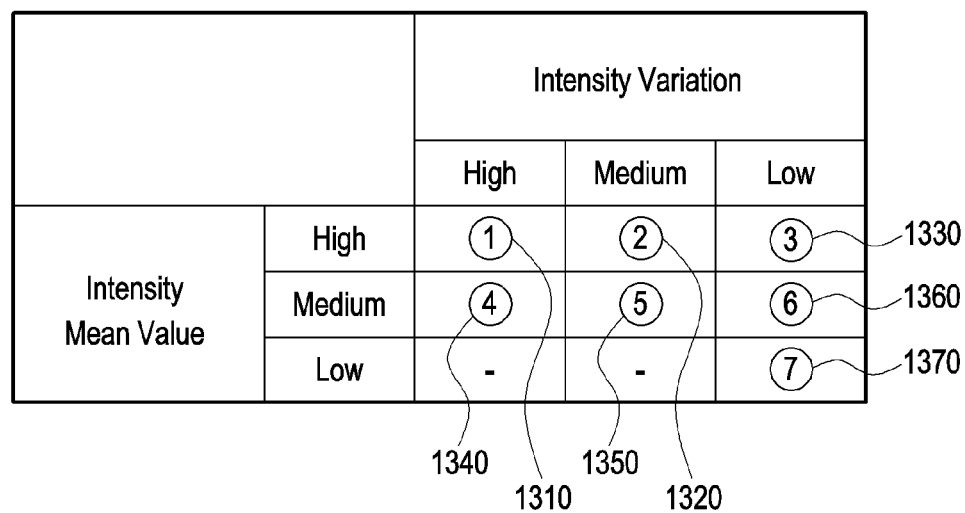
FIG. 13 is a diagram illustrating an operation in which an electronic device provides information on a UV protection ingredient applied to a user's skin according to various embodiments.

FIG. 13 is a diagram illustrating an operation in which an electronic device provides information on a UV protection ingredient applied to a user's skin according to various embodiments.

According to various embodiments, the electronic device 301 may identify a degree of a UV protection ingredient (e.g., a sunscreen) applied to a user's skin, based on a third image (or a fourth image) based on a first image and a second image, or a seventh image based on the fourth image.

Referring to FIG. 13, according to various embodiments, the electronic device 301 may identify, based on an intensity mean and an intensity variation of a sunscreen applied to a user's skin, the degree of the sunscreen applied thereto. For example, the intensity mean may indicate a degree (e.g., the average of brightness) of the brightness of a captured image of the user's skin. For example, in a case where a sunscreen is averagely incompletely applied to a user's skin, the intensity mean may be high. Alternatively, the averagely larger the sunscreen applied to a user's skin, the higher the intensity mean. The intensity variation may indicate a difference in application of the sunscreen between one point and another point.

According to various embodiments, in a case where it is determined that the intensity mean is high, and the intensity variation is high (as indicated by reference numeral 1310), the electronic device 301 may determine that the sunscreen has been less applied or hardly applied except for a partial area of the user's skin. In a case where it is determined that the intensity mean is high, and the intensity variation is medium (as indicated by reference numeral 1320), the electronic device 301 may determine that the sunscreen has been hardly applied overall to the user's skin. In a case where it is determined that the intensity mean is high, and the intensity variation is low (as indicated by reference numeral 1330), the electronic device 301 may determine that the sunscreen has been washed off very well in the entire area of the user's skin, or has not been entirely applied. In a case where it is determined that the intensity mean is medium, and the intensity variation is high (as indicated by reference numeral 1340), the electronic device 301 may determine that the sunscreen has been removed or has not been applied well in a partial area of the user's skin. In a case where it is determined that the intensity mean is medium, and the intensity variation is medium (as indicated by reference numeral 1350), the electronic device 301 may determine that the sunscreen has been removed or has not been applied well in the overall area of the user's skin. In a case where it is determined that the intensity mean is medium, and the intensity variation is low (as indicated by reference numeral 1360), the electronic device 301 may determine that the sunscreen has been uniformly applied in the overall area of the user's skin, but the UV protection effect is low. In a case where it is determined that the intensity mean is low, and the intensity variation is low (as indicated by reference numeral 1370), the electronic device 301 may determine that the sunscreen has been applied well in the overall area of the user's skin. Alternatively, in a case where the intensity mean is low, the electronic device 301 may also determine that the sunscreen has been applied well in the overall area of the user's skin, regardless of the intensity variation.

According to various embodiments, the electronic device 301 may display, on the display 380, a message indicating the degree of the sunscreen applied. Alternatively, the electronic device 301 may also display, on the display 385 of the external electronic device 304, a message indicating the degree of the sunscreen applied.

Figure 14A:
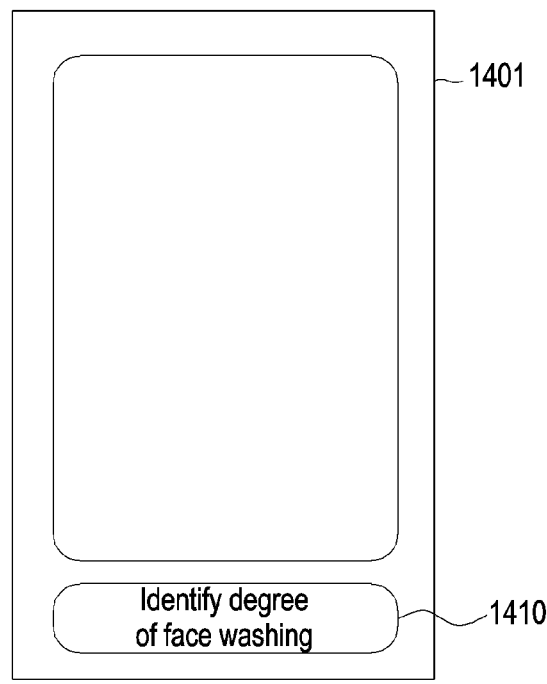
FIGS. 14A, 14B and 14C are diagrams illustrating an operation in which an electronic device provides information on a UV protection ingredient applied to a user's skin according to various embodiments.
Figure 14B:
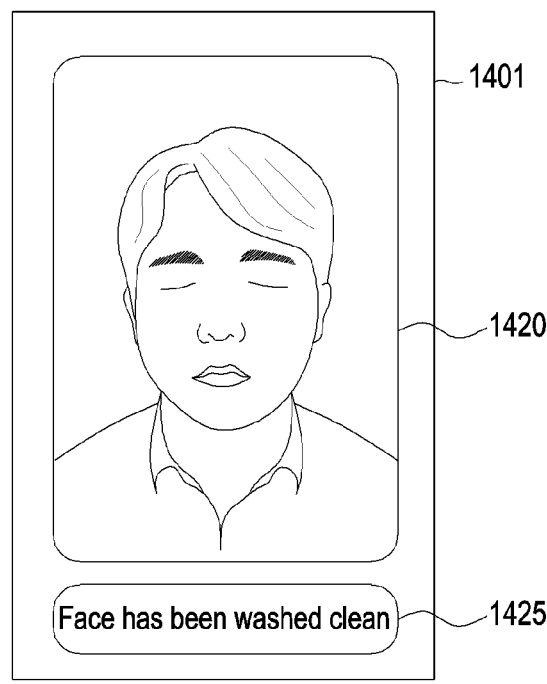
Figure 14C:
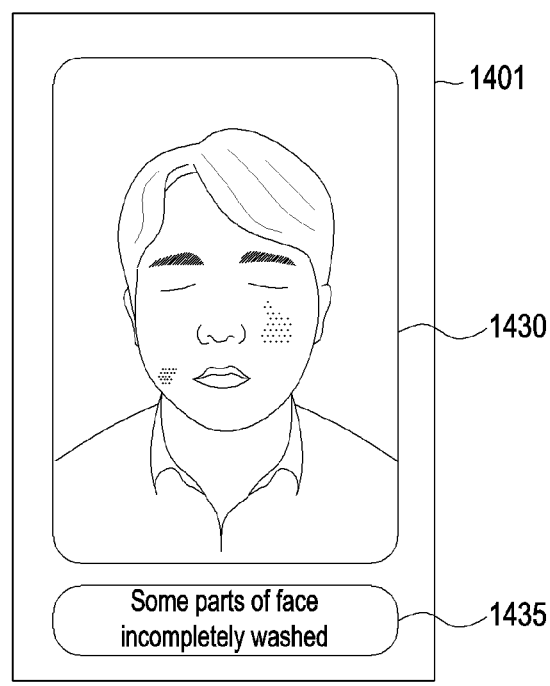

FIGS. 14A, 14B and 14C are diagrams illustrating an operation in which an electronic device provides information on a UV protection ingredient applied to a user's skin according to various embodiments.

Referring to FIG. 14A, an electronic device 1401 (e.g., the electronic device 301 in FIG. 3) may capture an image of a user's face, and provide information relating to a degree of face washing. The electronic device 1401 may display a first object 1410 which starts a face washing degree identification function, on a display (e.g., the display 360 or 385 in FIG. 3). The electronic device 1401 may start the face washing degree identification function in response to a user's input to the first object 1410. For example, the face washing degree identification function may be performed by a method of obtaining information on the UV protection ingredient (e.g., the sunscreen) applied to a user's skin, as described above.

Referring to FIG. 14B, the electronic device 1401 may determine that the face has been washed clean, in a case where it is determined that the intensity mean of the sunscreen applied to the user's face is high, and the intensify variation is low. The electronic device 1401 may display a first screen 1420 including a fifth image (a seventh image) obtained through visualization of a third image (or a fourth image). In addition, the electronic device 1401 may display a message 1425 indicating the degree of face washing.

Referring to FIG. 14C, the electronic device 1401 may determine that the sunscreen has not been removed in a partial area of the user's skin, in a case where it is determined that the intensity mean of the sunscreen applied to the user's face is medium (or low), and the intensify variation is high. The electronic device 1401 may display a second screen 1430 including a fifth image (a seventh image) obtained through visualization of a third image (or a fourth image). In addition, the electronic device 1401 may display a message 1435 indicating the degree of face washing.

Figure 15A:
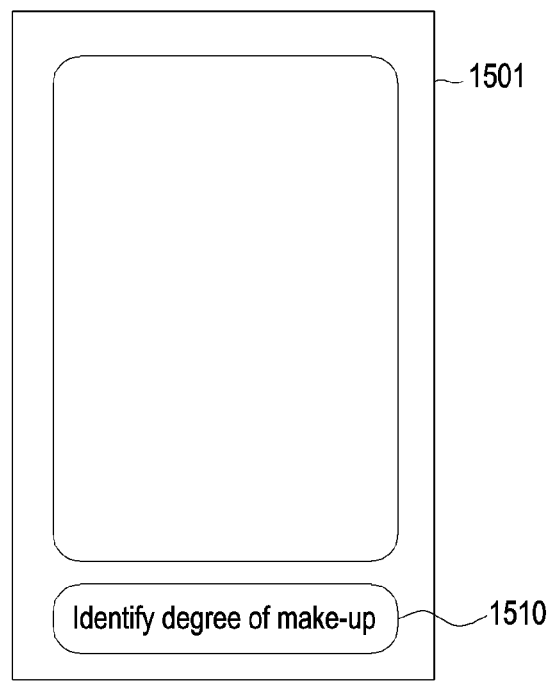
FIGS. 15A, 15B and 15C are diagrams illustrating an operation in which an electronic device provides information on a UV protection ingredient applied to a user's skin according to various embodiments.
Figure 15B:
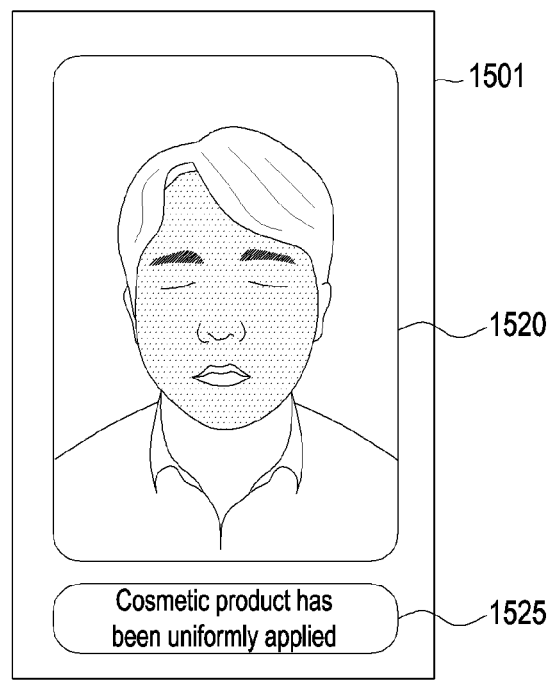
Figure 15C:
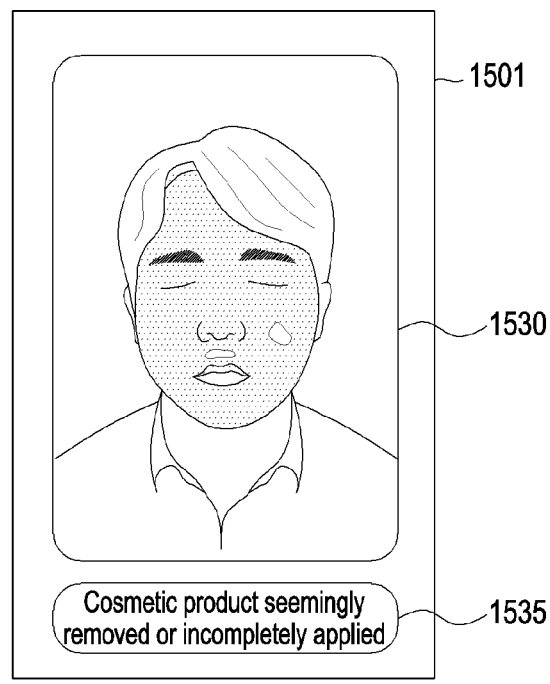

FIGS. 15A, 15B and 15C are diagrams illustrating an operation in which an electronic device provides information on a UV protection ingredient applied to a user's skin according to various embodiments.

Referring to FIG. 15A, an electronic device 1501 (e.g., the electronic device 301 in FIG. 3) may capture an image of a user's face, and identify a degree of a cosmetic product applied. The electronic device 1501 may display a second object 1510 which starts a make-up degree identification function, on a display (e.g., the display 360 or 385 in FIG. 3). The electronic device 1501 may start the make-up degree identification function in response to a user's input to the second object 1510. For example, the make-up degree identification function may be performed by a method of obtaining information on the UV protection ingredient (e.g., the sunscreen) applied to a user's skin, as described above.

Referring to FIG. 15B, the electronic device 1501 may determine that the make-up has been uniformly put on, in a case where it is determined that the intensity mean of the sunscreen applied to the user's face is low, and the intensify variation is low. The electronic device 1501 may display a third screen 1520 including a fifth image (a seventh image) obtained through visualization of a third image (or a fourth image). In addition, the electronic device 1501 may display a message 1525 indicating the degree of the make-up.

Referring to FIG. 15C, the electronic device 1501 may determine that the sunscreen has not been applied in a partial area of the user's skin, in a case where it is determined that the intensity mean of the sunscreen applied to the user's face is medium, and the intensify variation is high. The electronic device 1501 may display a fourth screen 1530 including a fifth image (a seventh image) obtained through visualization of a third image (or a fourth image). In addition, the electronic device 1401 may display a message 1535 indicating the degree of the make-up.

An electronic device (e.g., the electronic device 301 in FIG. 3) according to various embodiments may include a camera, a light source unit including at least one light resource element, a display, and a processor, wherein the processor is configured to obtain a first image for a user's skin through the camera while first light is output through the light source unit, obtain a second image for the user's skin through the camera while the first light is not output, obtain a third image representing a difference between the first image and the second image by converting, into a pixel value, a difference between brightness values of the first image and the second image, and display, on the display, information on a UV protection ingredient applied to the user's skin, based on the third image.

The processor may be configured to identify a type of a UV protection ingredient included in a cosmetic product of the user, and determine whether to output the first light, according to a result of the identification.

The processor may be configured to obtain an image for the cosmetic product through the camera, and identify the type of the UV protection ingredient included in the cosmetic product through a comparison between the image and pre-stored data.

The processor may be configured to, when the UV protection ingredient includes a reflective UV protection ingredient, output second light different from the first light through the light resource unit, while the second light is output, obtain a fourth image for the user's skin through the camera, and display, on the display, information on the UV protection ingredient applied to the user's skin, based on the fourth image.

The first light may include UV light, and the second light may include visible light.

The processor may be configured to display, on the display, a fifth image visualized through a conversion of a color space of the third image.

The processor may be configured to display, on the display, a sixth image visualized through application of a contrast characteristic of the third image to the second image.

The processor may be configured to convert first pixel values of the first image into first brightness values, convert second pixel values of the second image into second brightness values, convert, into pixel values, difference values between the first brightness values and the second brightness values, and based on the pixel values, obtain the third image.

The processor may be configured to identify first brightness values of the first image, identify second brightness values of the second image, convert, into pixel values, difference values between the first brightness values and the second brightness values, and obtain the third image based on the pixel values.

An operation method of an electronic device (e.g., the electronic device 301 in FIG. 3) according to various embodiments may include obtaining a first image for a user's skin through a camera included in the electronic device while first light is output through a light source unit included in the electronic device, obtaining a second image for the user's skin through the camera while the first light is not output, obtaining a third image representing a difference between the first image and the second image by converting, into a pixel value, a difference between brightness values of the first image and the second image, and displaying, on a display included in the electronic device, information on a UV protection ingredient applied to the user's skin, based on the third image.

The operation method of the electronic device may further include identifying a type of a UV protection ingredient included in a cosmetic product of the user, and determining whether to output the first light, according to a result of the identification.

The identifying of the type of the UV protection ingredient may include obtaining an image for the cosmetic product through the camera, and identifying the type of the UV protection ingredient included in the cosmetic product through a comparison between the image and pre-stored data.

The operation method of the electronic device may further include, when the UV protection ingredient includes a reflective UV protection ingredient, outputting second light different from the first light through the light resource unit, while the second light is output, obtaining a fourth image for the user's skin through the camera, and displaying, on the display, information on the UV protection ingredient applied to the user's skin, based on the fourth image.

The first light may include UV light, and the second light may include visible light.

The displaying of the information on the UV protection ingredient applied to the user's skin may include displaying, on the display, a fifth image visualized through a conversion of a color space of the third image.

The displaying of the information on the UV protection ingredient applied to the user's skin may include displaying, on the display, a sixth image visualized through application of a contrast characteristic of the third image to the second image.

The obtaining of the third image may include converting first pixel values of the first image into first brightness values, converting second pixel values of the second image into second brightness values, converting, into pixel values, difference values between the first brightness values and the second brightness values, and obtaining the third image, based on the pixel values.

An electronic device (e.g., the electronic device 301 in FIG. 3) according to various embodiments may include a camera, a display, and a processor, wherein the processor is configured to transmit a first control command to an external electronic device including at least one light source element so as to enable the external electronic device to output first light, obtain a first image for a user's skin through the camera while the first light is output, transmit a second control command to the external electronic device so as to enable the at least one light source element not to output the first light, obtain a second image for the user's skin through the camera while the first light is not output, obtain a third image representing a difference between the first image and the second image by converting, into a pixel value, a difference between brightness values of the first image and the second image, and provide information on a UV protection ingredient applied to the user's skin, based on the third image.

The processor may be configured to transmit a third control command to the external electronic device so as to enable the information on the UV protection ingredient to be displayed on a display included in the external electronic device.

In connection with the processor, when the external electronic device is implemented as a smart mirror, the electronic device may be held on the external electronic device, and when the external electronic device is implemented in an accessory type, the external electronic device may be attached and detached.

The invention claimed is:

1. An electronic device comprising:
   a camera;
   a light source unit;
   a display; and
   a processor; and
   a memory storing instructions, that, when executed by the processor, cause the electronic device to:
      obtain a first image of a skin of a user by the camera while a first light is output through the light source unit,
      obtain a second image of the skin of the user by the camera while the first light is not output through the light source unit,
      compare the first image and the second image by calculating a difference between first brightness values of the first image and second brightness values of the second image, obtain a third image representing a difference between the first image and the second image by converting, into a first difference pixel value, the difference between the first brightness values of the first image and the second brightness values of the second image, and display, on the display, information on an ultraviolet (UV) protection ingredient applied to the skin of the user, based on the third image, wherein the conversion of the difference between first brightness values of the first image and second brightness values of the second image into the first difference pixel value is based on a relation formula between a brightness value and a pixel value.

2. The electronic device of claim 1, wherein the instructions, when executed by the processor, cause the electronic device to:

identify a type of the UV protection ingredient included in a cosmetic product of the user, and determine whether to output the first light, based on a result of the identification.

3. The electronic device of claim 2, wherein the instructions, when executed by the processor, cause the electronic device to:

obtain a fourth image for the cosmetic product by the camera, and identify the type of the UV protection ingredient included in the cosmetic product based on a comparison between the fourth image and pre-stored data.

4. The electronic device of claim 2, wherein the instructions, when executed by the processor, cause the electronic device to:

based on the UV protection ingredient comprising a reflective UV protection ingredient, output a second light different from the first light through the light source unit, while the second light is output, obtain a fifth image for the skin of the user through the camera, and display, on the display, the information on the UV protection ingredient applied to the skin of the user, based on the fifth image.

5. The electronic device of claim 4, wherein the first light comprises UV light, and wherein the second light comprises visible light.

6. The electronic device of claim 1, wherein the instructions, when executed by the processor, cause the electronic device to:

display, on the display, a sixth image visualized through a conversion of a color space of the third image.

7. The electronic device of claim 1, wherein the instructions, when executed by the processor, cause the electronic device to:

display, on the display, a seventh image visualized through application of a contrast characteristic of the third image to the second image.

8. The electronic device of claim 1, wherein the instructions, when executed by the processor, cause the electronic device to:

convert first pixel values of the first image into the first brightness values, and convert second pixel values of the second image into the second brightness values.

9. The electronic device of claim 1, wherein the instructions, when executed by the processor, cause the electronic device to:

identify the first brightness values of the first image, and identify the second brightness values of the second image.

10. An operation method of an electronic device, the method comprising:

obtaining a first image of a skin of a user through a camera included in the electronic device while a first light is output through a light source unit included in the electronic device;

obtaining a second image of the skin of the user through the camera while the first light is not output through the light source unit;

comparing the first image and the second image by calculating a difference between first brightness values of the first image and second brightness values of the second image;

obtaining a third image representing a difference between the first image and the second image by converting, into a first difference pixel value, the difference between the first brightness values of the first image and the second brightness values of the second image; and displaying, on a display included in the electronic device, information on an ultraviolet (UV) protection ingredient applied to the skin of the user, based on the third image, wherein the converting the difference between first brightness values of the first image and second brightness values of the second image into the first difference pixel value is based on a relation formula between a brightness value and a pixel value.

11. The operation method of claim 10, further comprising:

identifying a type of the UV protection ingredient included in a cosmetic product of the user; and determining whether to output the first light, based on a result of the identification.

12. The operation method of claim 11, wherein the identifying of the type of the UV protection ingredient comprises:

obtaining a fourth image for the cosmetic product through the camera; and identifying the type of the UV protection ingredient included in the cosmetic product through a comparison between the fourth image and pre-stored data.

13. The operation method of claim 11, further comprising:

based on the UV protection ingredient comprising a reflective UV protection ingredient, outputting a second light different from the first light through the light source unit;

while the second light is output, obtaining a fifth image for the skin of the user through the camera; and displaying, on the display, the information on the UV protection ingredient applied to the skin of the user, based on the fifth image.

14. The operation method of claim 13, wherein the first light comprises UV light, and wherein the second light comprises visible light.

15. The operation method of claim 10, wherein the displaying of the information on the UV protection ingredient applied to the skin of the user comprises displaying, on the display, a sixth image visualized through a conversion of a color space of the third image.

16. The operation method of claim 10, wherein the displaying of information on an ultraviolet (UV) protection ingredient applied to the skin of the user comprises displaying, on the display, a seventh image visualized through application of a contrast characteristic of the third image to the second image.

17. The operation method of claim 10, wherein the obtaining of the third image comprises converting first pixel values of the first image into first brightness values and converting second pixel values of the second image into second brightness values.

18. An electronic device comprising:
   a camera;
   a display; and
   a processor; and
   a memory storing instructions, that, when executed by the processor, cause the electronic device to:
   transmit a first control command to an external electronic device including at least one light source element so as to enable the external electronic device to output first light,
      obtain a first image of a skin of user by the camera while the first light is output,
      transmit a second control command to the external electronic device so as to enable the at least one light source element not to output the first light,
      obtain a second image of the skin of the user by the camera while the first light is not output through the light source unit,
      obtain a third image representing a difference between the first image and the second image by converting, into a first difference pixel value, a difference between first brightness values of the first image and second brightness values of the second image, and
      provide information on an ultraviolet (UV) protection ingredient applied to the skin of user, based on the third image.

19. The electronic device of claim 18, wherein the instructions, when executed by the processor, cause the electronic device to:
   transmit a third control command to the external electronic device so as to enable the information on the UV protection ingredient to be displayed on a display included in the external electronic device.

20. The electronic device of claim 18, wherein the instructions, when executed by the processor, cause the electronic device to:
   when the external electronic device is implemented as a smart mirror, the electronic device may be held on the external electronic device, and
   when the external electronic device is implemented in an accessory type, the external electronic device may be attached and detached.

* * * * *